United States Patent
Li et al.

(10) Patent No.: US 12,501,269 B2
(45) Date of Patent: Dec. 16, 2025

(54) ENHANCED FEEDBACK FOR SECURE MODE WIRELESS COMMUNICATIONS

(71) Applicant: Intel Corporation, Santa Clara, CA (US)

(72) Inventors: Qinghua Li, San Ramon, CA (US); Feng Jiang, Santa Clara, CA (US); Jonathan Segev, Sunnyvale, CA (US); Xiaogang Chen, Portland, OR (US); Assaf Gurevitz, Ramat Hasharon (IL); Gadi Shor, Tel Aviv (IL); Robert Stacey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 271 days.

(21) Appl. No.: 18/477,455

(22) Filed: Sep. 28, 2023

(65) Prior Publication Data

US 2024/0031815 A1   Jan. 25, 2024

Related U.S. Application Data

(63) Continuation of application No. 17/134,021, filed on Dec. 24, 2020, now Pat. No. 11,805,420.
(Continued)

(51) Int. Cl.
*H04W 12/63* (2021.01)
*H04B 17/309* (2015.01)
(Continued)

(52) U.S. Cl.
CPC .......... *H04W 12/63* (2021.01); *H04B 17/309* (2015.01); *H04L 5/0048* (2013.01);
(Continued)

(58) Field of Classification Search
CPC ... H04W 12/63; H04W 12/122; H04W 12/50; H04W 24/10; H04W 52/242;
(Continued)

(56) References Cited

U.S. PATENT DOCUMENTS

2014/0269961 A1* 9/2014 Gao ............... H04L 1/0027
375/267
2016/0270087 A1* 9/2016 Soriaga ............ H04W 72/541
(Continued)

*Primary Examiner* — Don N Vo
(74) *Attorney, Agent, or Firm* — Eversheds Sutherland (US) LLP

(57) ABSTRACT

This disclosure describes systems, methods, and devices related to enhanced feedback for secure mode wireless communications. A device may send a first null data packet (NDP) to a second device, and identify a second NDP received from the second device. The device may identify a location measurement report (LMR) received from the second device, the LMR including a first channel response indicative of a first arrival time of the first NDP at the second device and a first phase shift associated with the first NDP. The device may generate a second channel response indicative of a second arrival time of the second NDP at the device and a second phase shift associated with the second NDP. The device may determine that the first channel response does not match the second channel response, and may identify an attempted attack.

20 Claims, 14 Drawing Sheets

Related U.S. Application Data

(60) Provisional application No. 63/012,509, filed on Apr. 20, 2020.

(51) Int. Cl.
*H04L 5/00* (2006.01)
*H04W 12/122* (2021.01)
*H04W 12/50* (2021.01)
*H04W 24/10* (2009.01)

(52) U.S. Cl.
CPC ......... *H04W 12/122* (2021.01); *H04W 12/50* (2021.01); *H04W 24/10* (2013.01)

(58) Field of Classification Search
CPC .. H04B 17/309; H04B 17/336; H04B 17/345; H04L 5/0048; H04L 25/0212
USPC ........................................................ 455/411
See application file for complete search history.

(56) References Cited

U.S. PATENT DOCUMENTS

| | | | | |
|---|---|---|---|---|
| 2019/0305998 | A1* | 10/2019 | Dahlman | H04L 25/0226 |
| 2022/0078649 | A1* | 3/2022 | Chen | H04L 5/0057 |
| 2023/0156622 | A1* | 5/2023 | Cha | H04L 5/0091 |
| | | | | 370/318 |

* cited by examiner

US 12,501,269 B2

ENHANCED FEEDBACK FOR SECURE MODE WIRELESS COMMUNICATIONS

CROSS-REFERENCE TO RELATED APPLICATION(S)

This application is a continuation of U.S. patent application Ser. No. 17/134,021, filed Dec. 24, 2020, which claims the benefit of U.S. Provisional Patent Application No. 63/012,509, filed Apr. 20, 2020, the disclosures of which are hereby incorporated herein by reference in its entirety.

TECHNICAL FIELD

This disclosure generally relates to systems and methods for wireless communications and, more particularly, to enhanced feedback for secure mode wireless communications.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
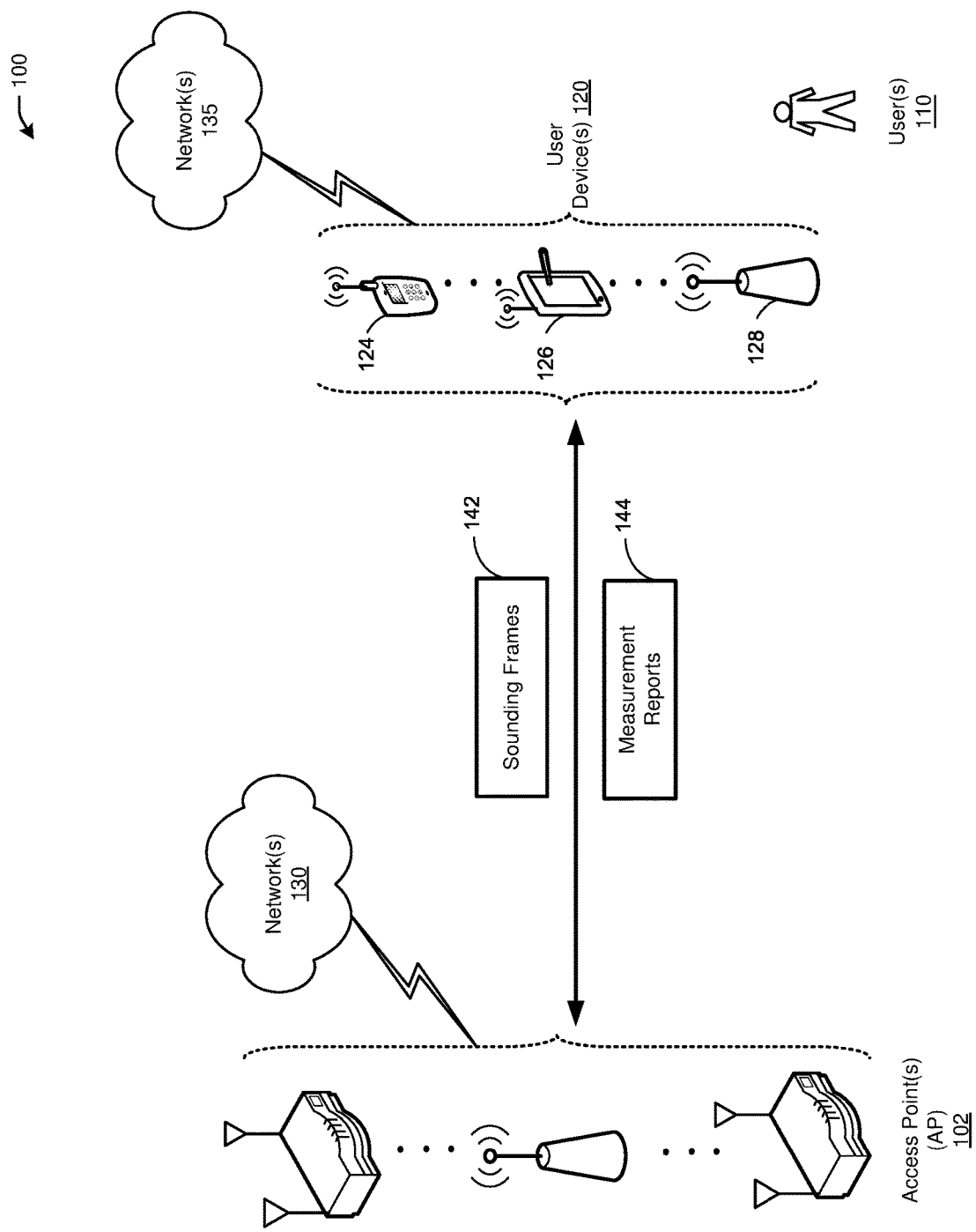
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In wireless communications defined by the IEEE 802.11 technical standards, the very high throughput (VHT) null data packet (NDP) Sounding-based 802.11az protocol is referred to as VHTz, the and high efficiency (HE) null data packet (NDP) Sounding-based 802.11az protocol is referred to as HEz. VHTz is based on the 802.11ac NDP and is a single user sequence, whereas HEz is based on 802.11ax NDP and 802.11az NDP and it supports multiuser operations.

The 802.11az secure mode considers secure communications to address new attack models. For example, an attacker listens to the beginning portion of the sounding symbol and detects which sounding signal is being sent. The attacker then sends the remainder of the sounding signal with a time shift such that the attacker's "fake" sounding signal arrives at an intended receiver with a fake channel arrival that is detected at the intended receiver. In this manner, an attacker may mimic a transmission from a non-attacker (e.g., "real" device) by sending a similar transmission to a receiving device, and timing the reception of the fake transmission to arrive just before the real transmission is to occur. The fake transmission from the attacker may result in the receiving device determining that the sender of the "real" transmission (the non-attacker) is closer to the receiving device than it actually is, thereby subjecting the receiving device to security vulnerabilities (e.g., unlocking for the attacker, etc.). To counter such attack attempts, enhanced feedback information may be provided from a sounding receiver to a sounding transmitter to allow for devices to detect attempted attacks.

In IEEE 802.11 communications, channel sounding refers to a process that allows devices to evaluate radiofrequency (RF) channels used for wireless communications. The IEEE 802.11 technical standards define processes for devices to exchange packets, such as NDPs, and use the NDPs to determine channel characteristics, determine relative device positions, and identify attempted attacks.

One known solution to detect attacks is for a device to perform a consistency check on the channels estimated based on multiple channel soundings within the channel coherence time. A receiver device can check the power fluctuation in the residual interference and noise after cancelling out superimposed sounding signals from a received signal. If there is a significant power fluctuation, an alert may be triggered so that the ranging security gets protected.

The channel responses between two antennas, one at each device in the sounding process, may be reciprocal. The reciprocal nature of the devices' antennas allows the devices to determine whether there is a fake channel arrival in the estimated channel responses, which is generated by an attacker.

In the context of ranging, an attacker or multiple attackers may want to generate a fake first channel arrival such that the ranging system of a device determines an incorrect device distance. The ranging sounding is usually bidirectional so that the two ranging devices sound the channel with each other, such that the channel response is estimated by both devices.

It is difficult for an attacker to generate the same fake multipaths (e.g., the multiple paths in between devices) in bidirectional soundings such that the phases, delays, and amplitudes relative to the true multipaths are the same in both directions. To generate the same fake multipaths in both directions, the attacker needs the perfect calibration of the transmit and receive chains, the perfect synchronization to the intended transmitter clock, the fine resolution detection of the multipaths in the received signal, and the knowledge of the randomized sounding signal. Among the difficulties, the synchronization needs to occur at the phase level not frequency level. The fine resolution multipath detection is also very challenging. Small multipaths need to be detected in the presence of the interferences from the strong multipaths. Furthermore, the attacker usually needs some time to analyze the beginning part of the received signal so that the attacker can detect which sounding signal is being sent and then sends the remaining part of the sounding signal with a time shift. Therefore, the attacker's sounding signal for generating the fake first arrival is usually incomplete. Provided the difficulties, there are mismatches in channel responses estimated from the two directions.

Because an attacker may detect which sounding signal is sent based on only a small fraction of a real sounding signal, the existing solution may not detect the attack accurately. For example, the consistency check may not reveal an attempted attack because the attacker may send a similar signal to arrive just before the actual signal that the real device sends.

There is therefore a need to enhance security protection for wireless communications.

Example embodiments of the present disclosure relate to systems, methods, and devices for using enhanced feedback for 802.11az Secure Mode wireless communications.

In one embodiment, an enhanced feedback for secure mode system may rely on the use of channel reciprocity. Channel responses estimated from bidirectional soundings (e.g., soundings in both directions—from a first device to a second device, and from the second device to the first device) should be the same or very similar (e.g., because the path between the devices is the same in both directions). If the relative relationships of the delays, phases, and/or amplitudes across the multi-paths are different from one sounding to the other, it triggers an alert. Because an attacker transceiver is an "active" device instead of a "passive" device (e.g., a reflective object), it is difficult for the attacker to generate the same fake channel arrival with the same delays, phases, and amplitudes in the signals received from the bidirectional soundings (e.g., because the attacker would need to replicate multiple signals, requiring perfect calibration of transmit and receive chains to achieve the replication, and without knowing the delays, phases, and amplitudes in the real signals in advance). An enhanced feedback for secure mode system may allow the sounding receiver to feedback channel state information (CSI, e.g., as defined in the IEEE 802.11 standards) in addition to time-of-arrival (ToA) for checking device reciprocity (e.g., ToA calculations of received signals may be used in combination with the known speed of light to determine device distance/location). The proposed feedback enhances the security of 11az communications. The proposed feedback only requires changes above a device's medium access control (MAC) layer (e.g., of the communication stack).

In one embodiment, the mismatches may be used by the sounding devices to detect an attack and trigger an alert. In a measure report (e.g., a location measurement report as defined by the IEEE 802.11 technical standards) of current 11az secure mode, {time of arrival (ToA), time of departure (ToD)} or {ToD, phase shift (PS)} are provided in the location measurement report (LMR). However, the LMR lacks amplitude and phase information about the individual multipaths or the overall picture of the multipaths. One device may not guarantee the security level of 11az secure ranging because the device relies on the other ranging device's security measure. Introducing additional feedback can help one device to guarantee the security of the ranging. Using the additional feedback, one device knows more about whether the measurement result provided by the other device is secure or not. For example, the sounding receiver feeds back all the measured sounding signals to the sounding transmitter such that the sounding transmitter has the same information as the sounding receiver. After the bidirectional soundings and measurement feedbacks, the sounding transmitter can decide whether the measurement results are secure or not based on the sounding transmitter's own criteria. To determine the channel reciprocity, the receiver of the sounding signal may provide feedback information in addition to ToA or PS. The additional information provides additional description about the multi-paths. The options for the feedback are presented herein.

In one embodiment, the receiver device may feed back ToA in the LMR, the ToA being the arrival time of the first channel arrival, and the PS determined by all multipaths real and fake estimated from the sounding. The PS may represent the average change of phase over frequency (e.g., the average slope of the phase), with the phase or phase change being determined by the whole estimated channel response in the sounding process. The ToA corresponds to the first channel arrival, which contributes to the phase change partially. In particular, the phase shift is determined jointly by the sounding signals from the different multipaths. The phase shift therefore represents an average phase slope. The ToA is determined by the first multipath that is just one of the multipaths used in a sounding operation. If the relative phase/amplitude relationship between the first multipath and the other multipaths used does not remain the same for both directions of the bidirectional sounding by the attacker(s), the attack can be detected by comparing the ToA and phase shift of one direction to those of the other direction. For example, the PS1-ToA1 should be equal to PS2-ToA2, if the channel is reciprocal. The PS may represent the arrival time of the centroid of the multipath profile or the average arrival time of the multipaths. So, fake ToAs and the corresponding PSs affected by the attackers may not match in both directions of the sounding.

In one embodiment, the receiver device may, using the LMR, feed back the starting time, starting from which a segment of the fed-back signal is received, and the segment(s) of the received signal. The received signal can be in either time domain or frequency domain. The effect of the sounding signal in the received signal may be removed. For example, the phase rotations of the 8PSK (phase shift keying) or QPSK (quadrature phase shift keying) modulation or 64QAM (quadrature amplitude modulation) on the subcarriers may be undone in frequency domain. As a result, the receiver of the feedback essentially has the full information and can estimate the ToA and the full channel response for the reciprocity check. In an example, the starting time may be the starting sampling time of the FFT or DFT window used by the receiver.

In one embodiment, the receiver device may, using the LMR, feed back the estimated channel response in either frequency domain or time domain. The starting time of the channel response needs to be fed back as well. Some compression technique may be applied to reduce the feedback overhead. For example, the time domain multipaths below an interference and noise level may not be fed back. The delays with respect to the starting time, the amplitudes, and the phases of the strong multipaths above the threshold may be fed back. The threshold may be fed back as well. The first and the strongest (e.g., in amplitude/magnitude) multipaths provide detailed information.

In one embodiment, the receiver device may, using the LMR, feed back the delays, phases, and amplitudes of the first channel arrival and the strongest channel arrival. In addition, the PS may be fed back as well. The first and the strongest multipaths provide detailed information and the PS provides the overall information.

In existing 11az, there is a mechanism for attack detection. Multiple ranging soundings are sent within the channel coherence time. Assuming the channel response remains unchanged between the soundings, the receiver compares the channel responses estimated from the multiple soundings to identify any inconsistency across the channel responses due to attacks. In one embodiment, the differences between two channel responses estimated from two soundings within the channel coherence time is a good metric for detecting the attacks. The differences can be in time domain or frequency domain. Because the clocks (e.g., the frequency clock and the sampling clock) of devices may drift and may be offset, the common phase offset or linear phase shift in frequency domain should be removed before calculating the difference. The common phase offset between two channel responses may be calculated as:

$$\theta = \text{phase}(\hat{h}_1^H \hat{h}_2) \quad (1),$$

where $\hat{h}_1$ and $\hat{h}_2$ are two column vectors carrying the two channel responses estimated in frequency (or time) domain, respectively. $\hat{h}_1^H$ is the conjugate and transpose of $\hat{h}_1$. The common phase is removed as:

$$\tilde{h}_1 = e^{j\theta}\hat{h}_1 \text{ or } \tilde{h}_2 = e^{-j\theta}\hat{h}_2. \quad (2)$$

The difference between the two channel responses may be:

$$d_{2,1} = \hat{h}_2 - \tilde{h}_1 \text{ or } d_{1,2} = \hat{h}_1 - \tilde{h}_2. \quad (3).$$

The variance of the elements of the difference vector e.g. $d_{2,1}$ or the squared norm of the difference vector e.g. $d_{2,1}$ are denoted by $\text{var}(d_{2,1,i})$ and $\|d_{2,1}\|^2$, respectively. The variance or squared norm may be determined over the differences among more than two channel responses. These are useful indications for identifying the attack. The reason is as follows. The differences between the two channel responses estimated from the two soundings come from 1) the different noise realizations at the receiver over the two soundings and 2) the attack signals over the two soundings. For the latter part, because the sounding signals usually are changed across soundings, the attacker needs to change the attack signal accordingly but may fail to do so when not knowing sounding signals beforehand. Since the attacker needs to listen to the beginning part of the sounding signal for detecting which sounding signal out of a signal set is being sent, the attack signal sent after listening is always not a complete sounding signal. Therefore, the missing beginning parts in the varying attack signals account for part of the differences between the two channel responses estimated at the intended receiver. If the variation of the differences between the two channel responses is significantly greater than the variation caused by the noises received at the intended receiver, it is likely that there is an attack or interference. In some communications, the security level of the sounding receiver is not guaranteed. Some receivers may set a high threshold when checking the consistency across channel responses estimated from adjacent soundings, while other devices may set a lower threshold. The ranging sounding may be bidirectional. Both ranging devices need to apply security checks for secure ranging. Otherwise, the measured distance may be a fake one caused by an attacker. Feeding back the variance of the elements of the difference vector (e.g. the one in Equation (3)) and the variance of the noise allows a device to check the security of the measurement results using the device's own security criterions. For example, if $\text{var}(d_{2,1,i}) > \alpha \sigma^2$, then the device may declare the measurement result is not trustable, where $\alpha$ is the parameter chosen by the device; and $\sigma^2$ is the variance of interference plus noise. The lower the $\alpha$, the high false alarm rate and the higher security level. Instead of the variances, the receiver may feed back the detection result and may feed back the threshold $\alpha$ used in the attack detection as well. Threshold $\alpha$ may be decided and exchanged during the negotiation phase of the ranging.

In one embodiment, there are two types of attacker. One attacker knows the entire real sounding signal (e.g., when the legacy non-secure sounding signal is used). The other attacker listens to the beginning of the sounding signal, detects which sounding signal is being sent, and then sends the attack signal. For the second attacker type, the attack signal misses the beginning part of the sounding signal. There is an efficient way to detect the attack. The received signal consists of the complete sounding signal and its delayed, attenuated copies carried by multipaths. The attack signal that missing the beginning part of the real signal is also in the received signal at the receiver device. The receiver estimates the time domain channel response. The attack signal causes a fake channel arrival earlier than those of the genuine ones. The missing beginning part of the attack signal generates fake, small channel arrivals all over the time domain. The receiver refines the estimate of the channel response. It cuts off the channel arrivals beyond the maximum propagation delay (e.g., 0.2 microseconds) and the channel arrivals below a threshold determined by the interference plus noise level, resulting in a refined channel response. Using the refined channel response, the receiver reconstructs the received sounding signal. The reconstructed sounding signal is then subtracted from the received sounding signal for calculating the residual signal. If there is no attack, the residual signal should consist of only noise and interference. If there is an attack signal missing the beginning part of the sounding signal, then there are residual signals with power levels above the interference plus noise level. The power level of the residual signals at the time interval of the missing beginning part is even higher than the rest. The increased power level in the residual signals can be used to detect the attack. A threshold $\alpha$ may be chosen and exchanged between ranging devices. If $\text{var}(r) > \alpha \sigma^2$, then attack is declared, where $\sigma^2$ is the variance of interference plus noise; and r is the residual signal in the decision window (e.g., the time interval of the beginning part of the sounding signal corresponding to first detected channel arrival or the time interval of the whole sounding symbol).

In one embodiment, because different devices may use different methods or different thresholds for the same method for detecting the attack, details can be added to 11az standard to guarantee the security level. For example, the standard may specify the attack detection method (e.g., the consistency check described above and the high-power residual detection described above). The detection parameters such as the thresholds also may be exchanged. Because it may not be feasible to standardize the thresholds, the variance of the residual signals, and/or the variance of the interference plus noise, and/or the variance of noise may be fed back to allow the receiver of the feedback to decide whether there is an attack in the measurement or whether the measurement is secure.

In one embodiment, for secure applications such as door/monitor unlocking, the two ranging devices need to be close and in line of sight (LOS) condition. If it is not LOS, it is usually unsecure to unlock a door/monitor. For example, a key fob and the car need to be close and in LOS condition so that the car is unlocked. For another example, if the user is outside of the room but in a short distance to the laptop inside the room, the laptop should not be unlocked. It enhances the security that the receiver reports whether the first channel arrival is the strongest multipath among all the multipaths. If the answer is positive, it is very likely that the devices are in LOS condition. In the location measurement report (LMR), which the receiver sends to the sounding transmitter, a field or a bit may indicate whether the first channel arrival is the strongest. Checking whether the first arrival is the strongest can be mandated by the spec. For example, for secure ranging, the receiver may only report the strongest arrival as the first channel arrival and treat any arrival detected before the strongest as an interference. For another example, for a certain ranging mode such as secure and short range measurement, the receiver may report the arrival time of the first channel arrival and use an existing field, which indicates the reliability of the measurement, to invalidate the reported arrival time if the first arrival is not the strongest.

In one embodiment, besides the channel response, path loss is also a useful channel state information for security check. The path loss should be the same for the bidirectional soundings since the wireless channels of the two directions are reciprocal. For example, the signal-to-noise ratios (SNRs) or signal-to-interference-plus-noise ratios (SINRs) of the forward and reverse directions should be roughly the same after compensating the transmission power difference. If the compensated SNRs or SINRs do not match, the measurement results may not be reliable. Therefore, SNR or SINR is also useful for a security check. For the receiver to estimate the path loss, the transmission power of the sounding signal may be fed back (e.g., in the LMR). The transmission power currently may not be in the LMR. In addition to the transmission power, normalized noise power or normalized interference power or normalized interference plus noise power may be fed back. Alternatively, compensated SNR, SIR, or SINR may be fed back. If the attacker is unaware of the full information about the sounding signal, the attack signal usually causes interference at the intended receiver. Detecting whether the interference level is increased or not helps to identify an attack. A normalized interference power e.g. the interference power spectrum density may be fed back. In addition or alternative to the SNR, SIR or SINR, the ratio of interference to noise may be fed back.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 7:
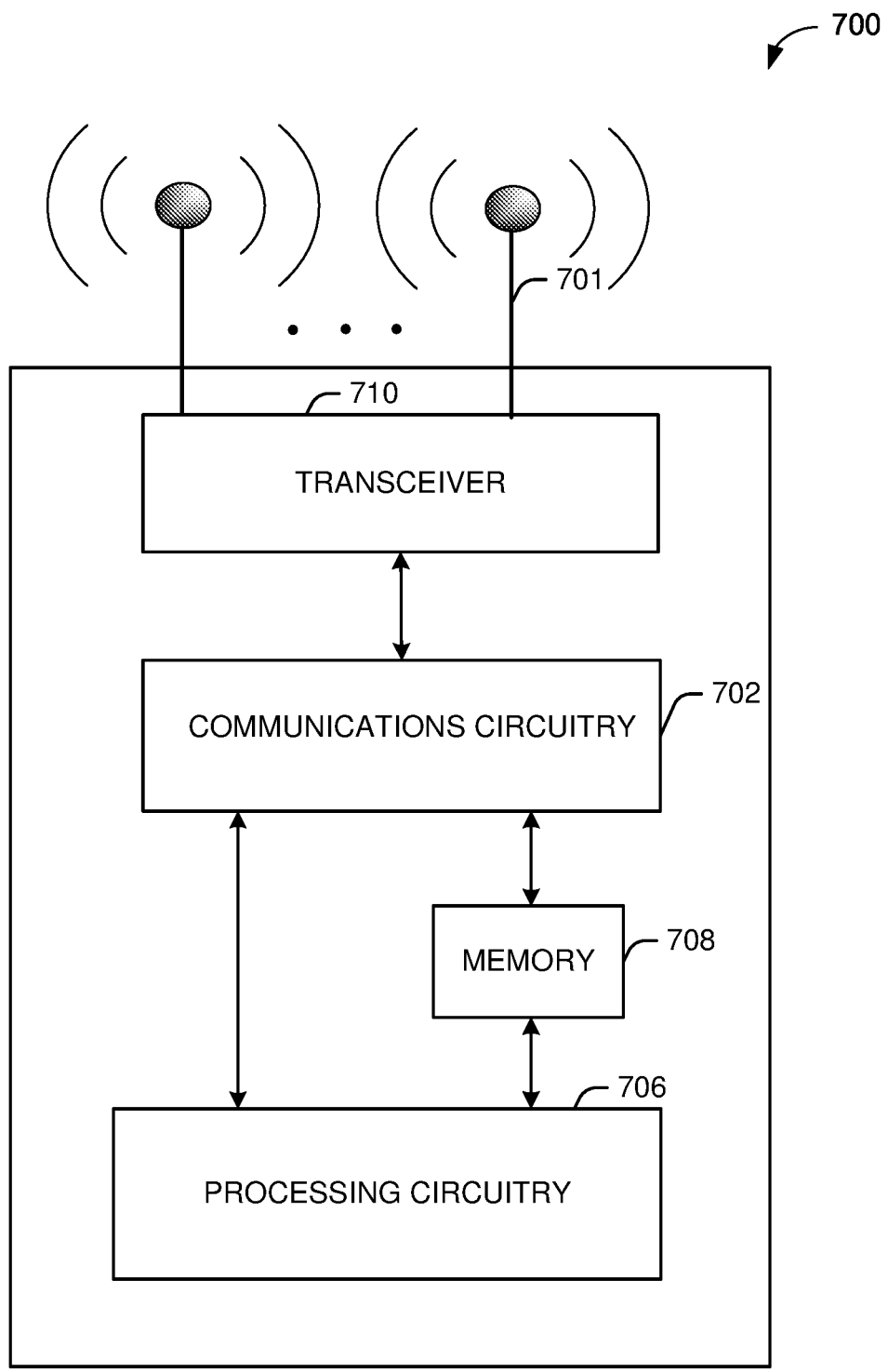
FIG. 7 illustrates a functional diagram of an exemplary communication station that may be suitable for use as a user device, in accordance with one or more example embodiments of the present disclosure.
Figure 8:
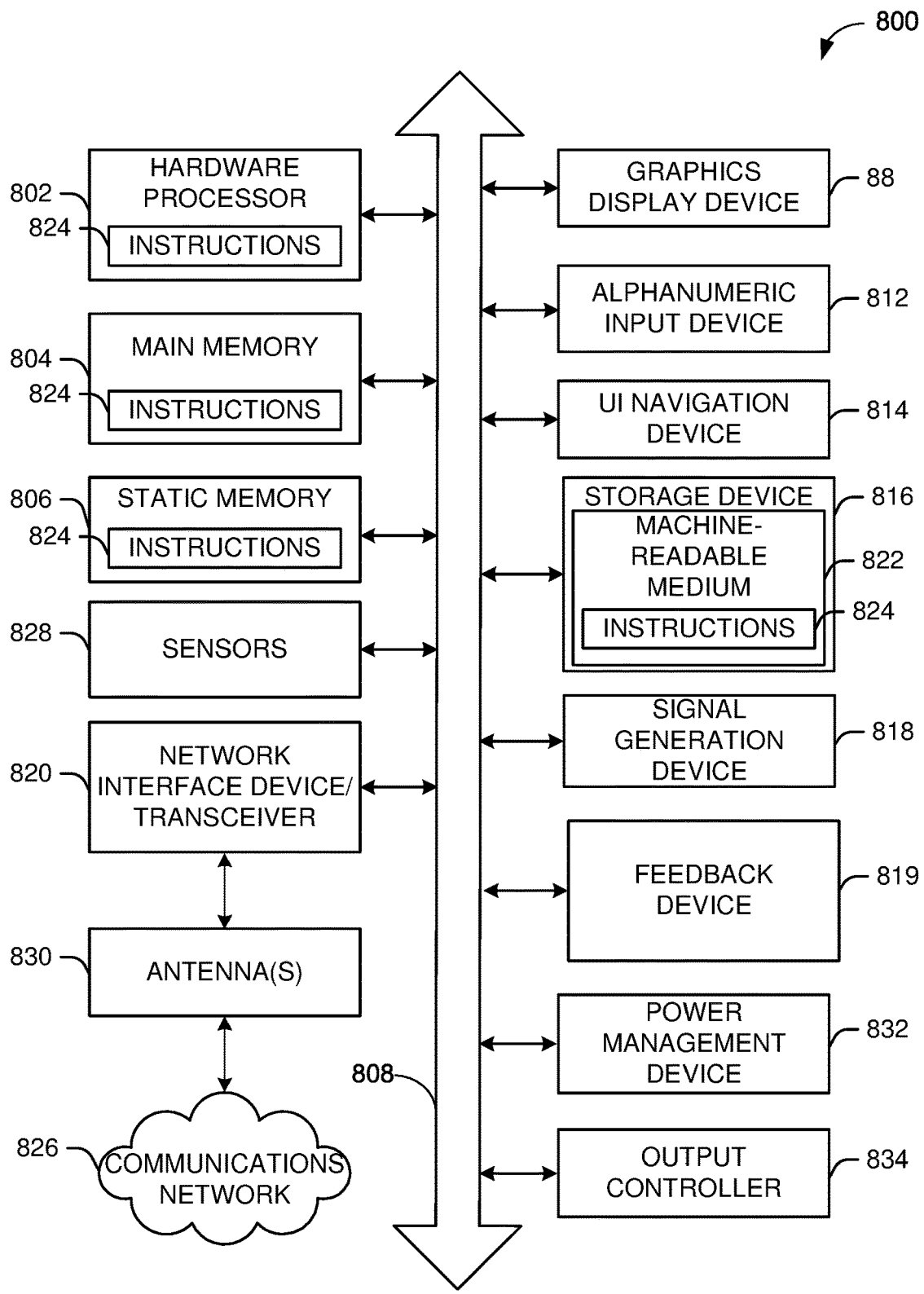
FIG. 8 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 7 and/or the example machine/system of FIG. 8.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay, 802.11az). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2A:
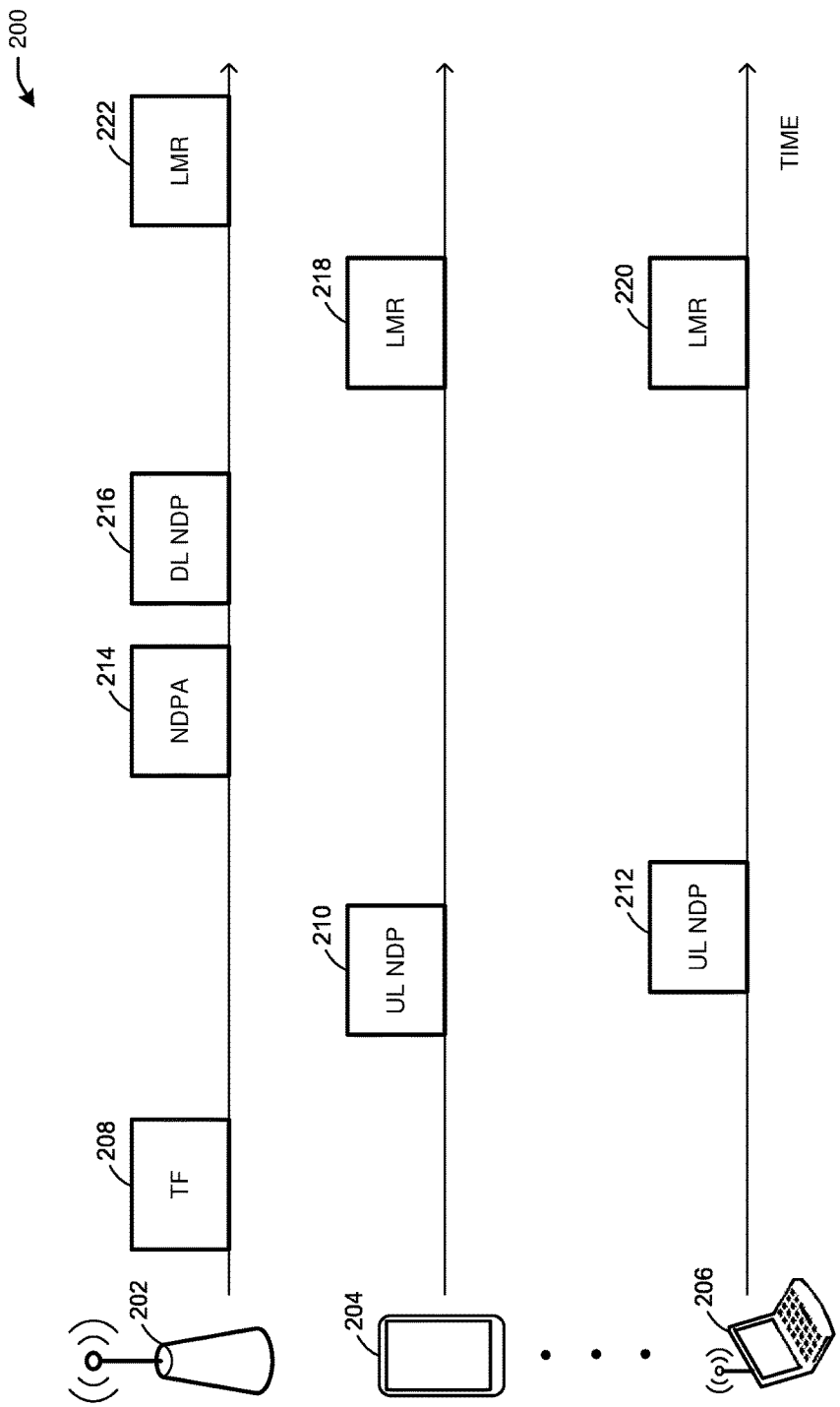
FIG. 2A depicts and schematic diagram for a trigger-based channel sounding process, in accordance with one or more example embodiments of the present disclosure.
Figure 2B:
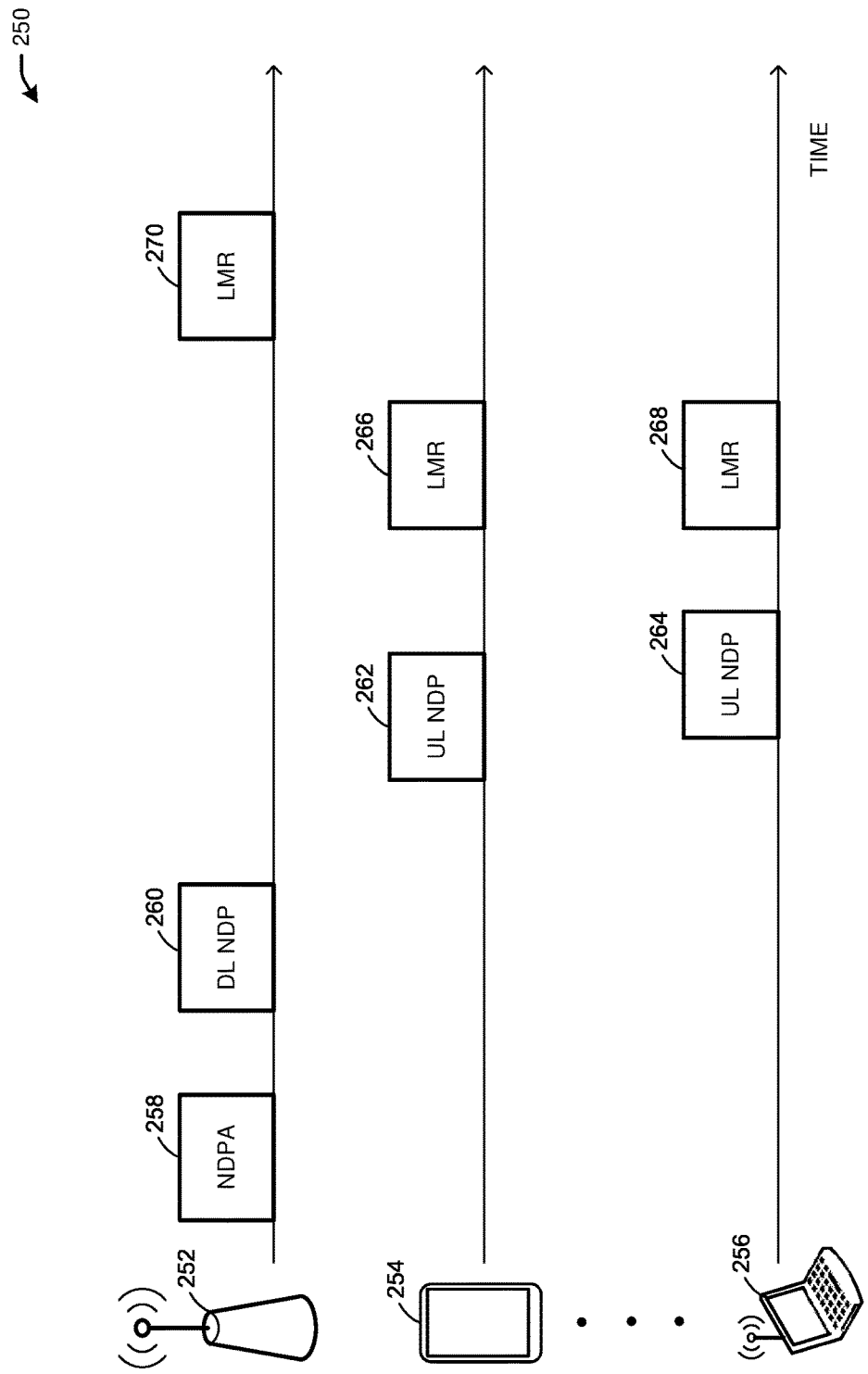
FIG. 2B depicts and schematic diagram for a non-trigger-based channel sounding process, in accordance with one or more example embodiments of the present disclosure.

In one embodiment, and with reference to FIG. 1, the AP 102 and/or the user devices 120 may exchange sounding frames 142 (e.g., NDPs, NDPAs, trigger frames, etc.) and measurement reports 144 (e.g., LMRs) as shown in FIGS. 2A and 2B. The sounding frames 142 and LMRs 144 may be used in channel sounding operations as explained further herein.

It is understood that the above descriptions are for purposes of illustration and are not meant to be limiting.

It is understood that the above descriptions are for purposes of illustration and are not meant to be limiting.

FIG. 2A depicts and schematic diagram for a trigger-based channel sounding process 200, in accordance with one or more example embodiments of the present disclosure. In IEEE 802.11 communications, channel sounding refers to a process that allows devices to evaluate radiofrequency (RF) channels used for wireless communications. The IEEE 802.11 technical standards define processes for devices to exchange packets, such as NDPs, and use the NDPs to determine channel characteristics, determine relative device positions, and identify attempted attacks.

Referring to FIG. 2A, an AP 202 may perform trigger-based channel sounding with an STA 204 and an STA 206, in accordance with the IEEE 802.11 standards. The AP 202 may send a trigger frame (TF) 208 (e.g., a frame that indicates to addressed devices are to send responses to the AP 202). In response to receiving the TF 208, the STA 204 may send an uplink (UL) NDP 210, and the STA 206 may send a UL NDP 212 as part of the channel sounding process (e.g., an NDP may lack a payload). Once the AP 202 has received the UL NDPs 210 and 212, the AP 202 may announce that it also will sound the channel by sending an NDP-announcement (NDPA) 214 frame announcing that a downlink NDP 216 is to be transmitted, and then transmitting the DL NDP 216. Based on the DL NDP 216, the STAs 204 and 206 both may determine CSI and other channel information, and may generate and send LMRs to the AP 202 (e.g., the STA 204 may generate and send LMR 218, and the STA 206 may generate and send LMR 220). For example, the LMRs 218 and 220 may include the respective ToA of the DL NDP 216 at the STA 204 and the STA 206, along with the ToDs and the PS of the UL NDP 210 and 212. The AP 202 may generate and send LMR 222 to the STAs 204 and 206, the LMR 222 including the ToAs of the UL NDPs 210 and 212, and the ToD and PS of the DL NDP 216 (or a previously sent DL NDP).

FIG. 2B depicts and schematic diagram for a non-trigger-based channel sounding process 250, in accordance with one or more example embodiments of the present disclosure. FIG. 2B refers to a sounding process similar to that in FIG. 2A, but without requiring a trigger frame.

Referring to FIG. 2B, an AP 252 may perform trigger-based channel sounding with an STA 254 and an STA 256, in accordance with the IEEE 802.11 standards. The AP 252 may send an NDPA 258 to announce the sending of a DL NDP 260, and may send the DL NDP 260. The STAs 254 and 256 may receive the DL NDP 260 and respond by sending UL NDPs (e.g., the STA 254 may send UL NDP 262, and the STA 256 may send UL NDP 264). After exchanging UL and DL NDPs, the AP 252 and the STAs 254 and 256 may generate and send respective LMRs. The STA 254 may send LMR 266, the STA 256 may send LMR 268, and the AP 252 may send LMR 270. The LMRs may include ToAs of frames received, ToDs of frames sent, and PS of frames sent by the respective device sending the LMR.

Figure 3A:
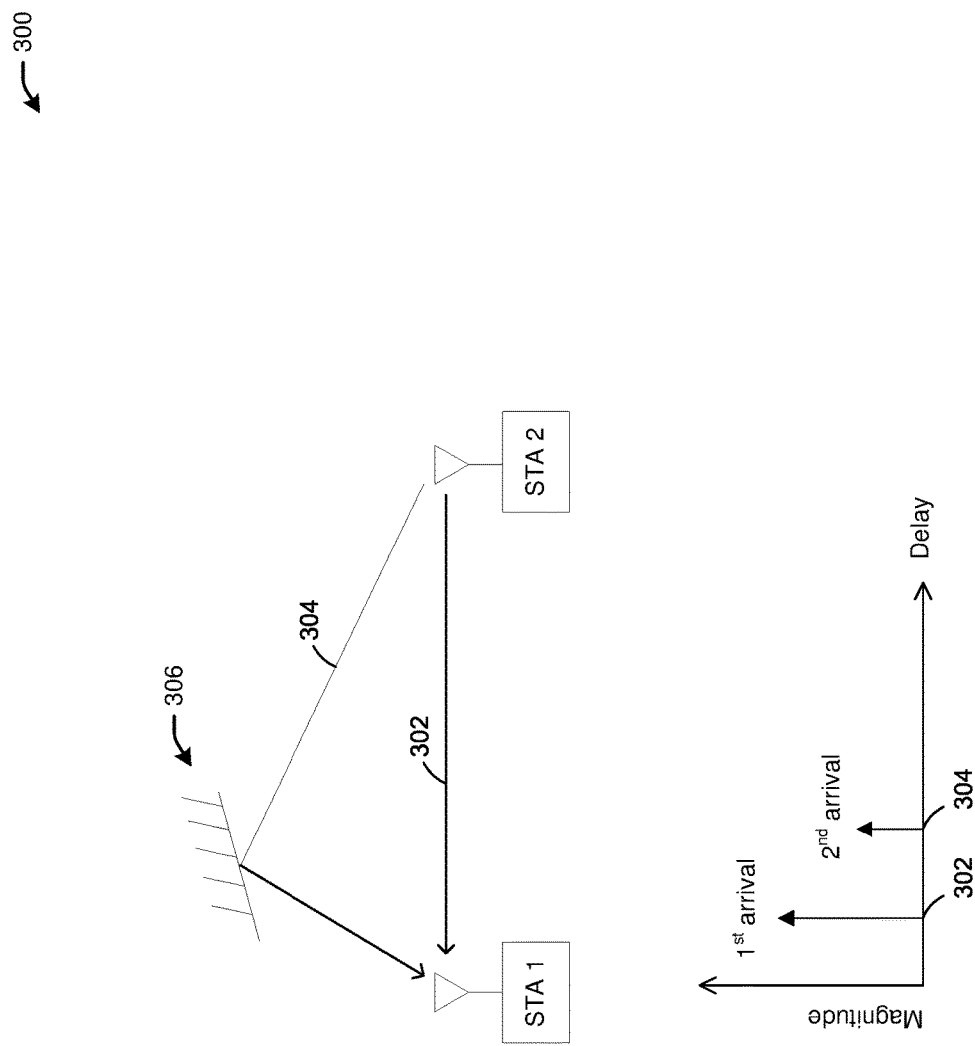
FIG. 3A depicts an illustrative system for a channel sounding process, in accordance with one or more example embodiments of the present disclosure.

FIG. 3A depicts an illustrative system 300 for a channel sounding process, in accordance with one or more example embodiments of the present disclosure.

Referring to FIG. 3A, the system 300 may include multiple devices (e.g., STA 1, STA 2) performing channel sounding. For example, the STA 2 may send a first sounding signal 302 and a second sounding signal 304 (e.g., NDPs as shown in FIGS. 2A and 2B). The second sounding signal 304 may reflect off of object 306 (e.g., an object or person), resulting in a different ToA than the ToA of the first sounding signal 302 at STA 1. As shown in FIG. 3A, the first arrival at STA 1 may be the ToA of the first sounding signal 302, and the second arrival at STA 1 may be the ToA of the second sounding signal 304. As shown, the magnitude of the first sounding signal 302 may be greater than the magnitude of the second sounding signal 304 (e.g., because the second sounding signal 304 reflected off of the object 306, which may be further away from STA 1 than is STA 2).

While not shown, the process may be bidirectional, in which case STA 1 may send sounding signals to STA 2 similar to the first sounding signal 302 and the second sounding signal 304, using the same paths, but in the opposite direction. The channel responses at both STAs should be the same, allowing for the STAs to determine whether any ToA is fake and likely generated by an attacker as shown in FIG. 3B.

Figure 3B:
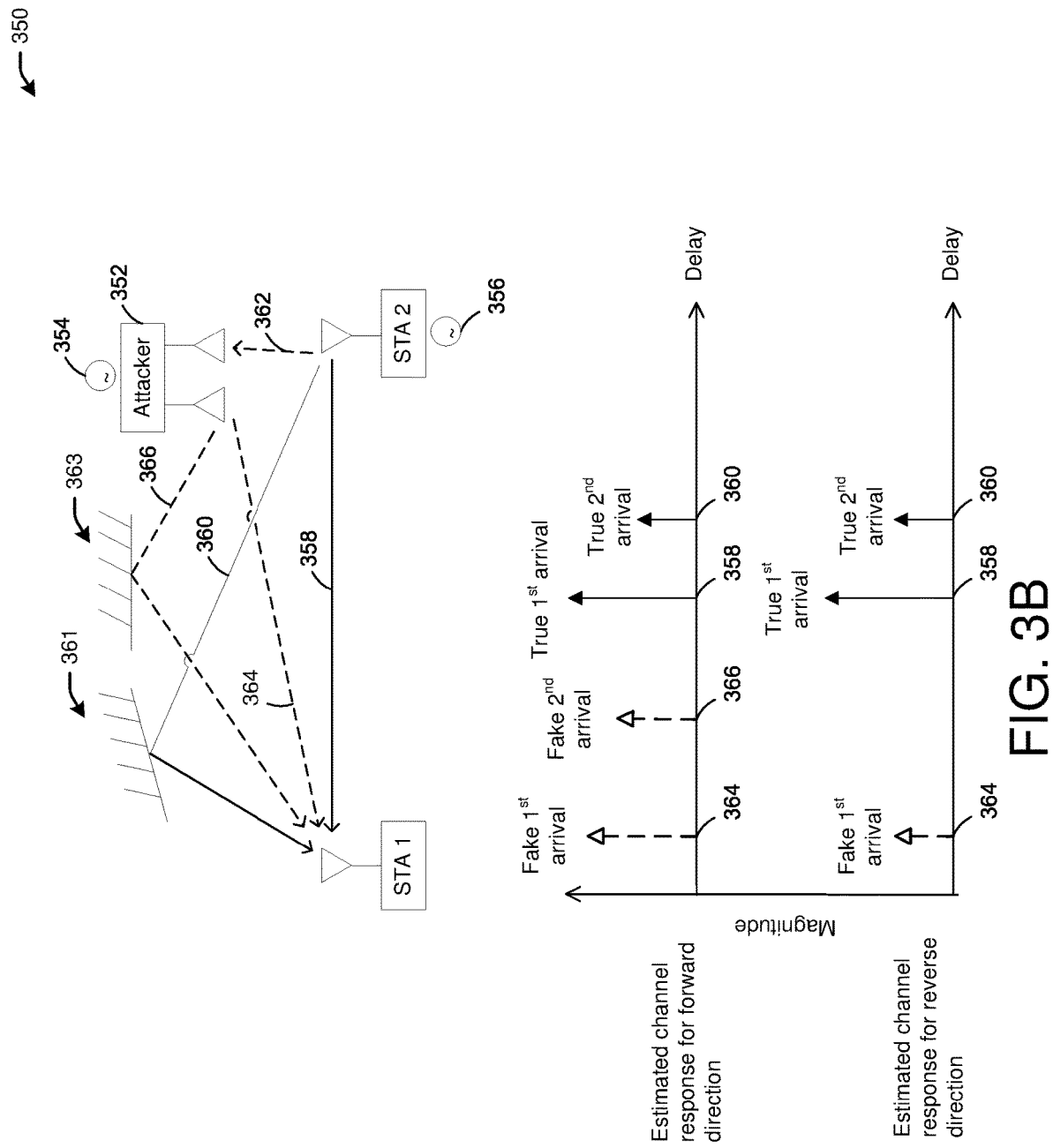
FIG. 3B depicts an illustrative system for a channel sounding process when an attacker exists, in accordance with one or more example embodiments of the present disclosure.

FIG. 3B depicts an illustrative system 350 for a channel sounding process when an attacker exists, in accordance with one or more example embodiments of the present disclosure.

Referring to FIG. 3B, the system 350 may include multiple devices (e.g., STA 1, STA 2) performing channel sounding. An attacker device 352 with an oscillator 354 may attempt to replicate sounding signals sent by STA 2, which may have an oscillator 356. For example, the STA 2 may send a first sounding signal 358 and a second sounding signal 360 (e.g., NDPs as shown in FIGS. 2A and 2B). The second sounding signal 360 may reflect off of object 361 (e.g., an object or person), resulting in a different ToA than the ToA of the first sounding signal 358 at STA 1. The attacker device 352 may receive a third sounding signal 362 from STA 2 and may replicate the third sounding signal 362 by sending a fourth sounding signal 364 and a fifth sounding signal 366, intended to arrive at STA 1 before the first sounding signal 358 and the second sounding signal 360.

Still referring to FIG. 3B, the estimated channel response in the forward direction (e.g., from STA 2 to STA 1) may include a fake first arrival (e.g., the ToA of the fourth sounding signal 364), a fake second arrival (e.g., the ToA of the fifth sounding signal 366), a true first arrival (e.g., the ToA of the first sounding signal 358), and a true second arrival (e.g., the ToA of the second sounding signal 360. The fifth sounding signal 366 may arrive at STA 1 later than the fourth sounding signal 364 (e.g., because it may reflect off of an object 363), but before the second sounding signal 360 to perpetrate an attack. Similarly, the fourth sounding signal 364 may arrive at STA 1 before the first sounding signal 358 to perpetrate an attack.

It is difficult for the attacker device 352 to generate the same fake multipaths in bidirectional soundings as the sounding signals sent by STA 1 and STA 2 such that the phases, delays, and amplitudes relative to the true multipaths are the same in both directions. To generate the same fake multipaths in both directions, the attacker device 352 needs the perfect calibration of the transmit and receive chains, the perfect synchronization to the intended transmitter clock (e.g., via the oscillator 354), the fine resolution detection of the multipaths in the received signal, and the knowledge of the randomized sounding signal. Among the difficulties, the synchronization needs to occur at the phase level not frequency level. The fine resolution multipath detection is also very challenging. Small multipaths need to be detected in the presence of the interferences from the strong multipaths. Furthermore, the attacker device 352 usually needs some time to analyze the beginning part of the received signal (e.g., the third sounding signal 362) so that the attacker device 352 can detect which sounding signal is being sent, and then sends the remaining part of the sounding signal with a time shift (e.g., the fourth sounding signal 364 and the fifth sounding signal 366). Therefore, the attacker's sounding signal for generating the fake 1first arrival is usually incomplete. Provided the difficulties, there are mismatches in channel responses estimated from the two directions as shown in FIG. 3B.

Figure 4:
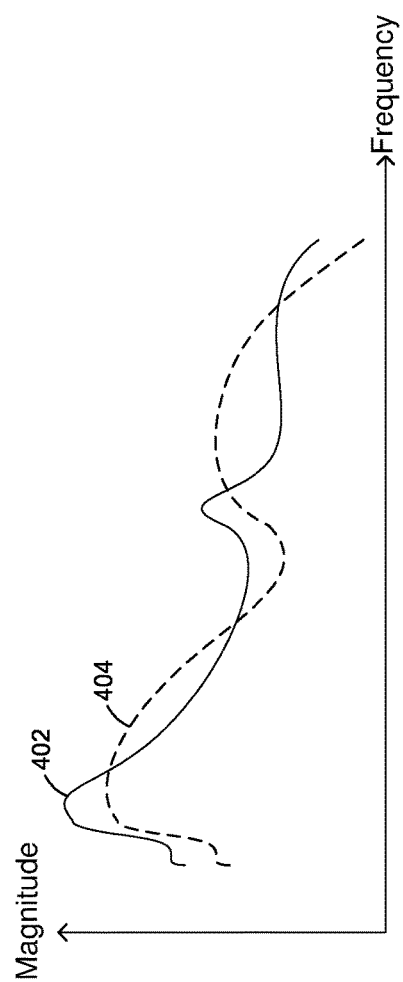
FIG. 4 is a graph showing a signal magnitude in the frequency domain, in accordance with one or more example embodiments of the present disclosure.

The mismatched responses (e.g., in the forward and reversed directions) in FIG. 3B or in FIG. 4 may be used by the STAs to detect the attack and trigger an alert. In the measure report of current 11az secure mode, only {time of arrival (ToA), time of departure (ToD)} or {ToD, phase shift (PS)} are sent. There is no amplitude and phase information about the individual multipaths or the overall picture of the multipaths. For checking the channel reciprocity, the receiver of the sounding signal may feed back information in addition to ToA or PS. The additional information provides additional description about the multipaths in FIG. 3B. The present disclosure provides some descriptions about the details or/and the overall (or averaged) quantities of the channel response for enabling the reciprocity check.

FIG. 4 is a graph 400 showing a signal magnitude in the frequency domain, in accordance with one or more example embodiments of the present disclosure.

Referring to FIG. 4, the graph 400 shows two different estimated channel responses 402 and 404 in the frequency domain.

In one or more embodiments, the additional feedback information (e.g., included in the LMRs of FIGS. 2A and 2B) to identify attempted attacks as in FIG. 3B may include the ToA of the receiving device. For example, the STA 1 may send an LMR to STA 2 including the first true ToA (e.g., the ToA of the first sounding signal 358), and the PS determined by all multipaths used in the sounding.

In one or more embodiments, the additional feedback information (e.g., included in the LMRs of FIGS. 2A and 2B) to identify attempted attacks as in FIG. 3B may include the starting time, starting from which a segment of the fed back signal is received, and the segment(s) of the received signal. The received sounding signal can be in either time domain or frequency domain. The effect of the sounding signal in the received signal may be removed. For example, the phase rotations of the 8PSK or QPSK modulation on the subcarriers may be undone in frequency domain. As a result, the receiver of the feedback (e.g., STA 2) essentially has the full information and can estimate the ToA and the full channel response in FIG. 3B or FIG. 4 for the reciprocity check. In an example, the starting time may the starting sampling time of the FFT or DFT window used by the receiver.

Figure 5:
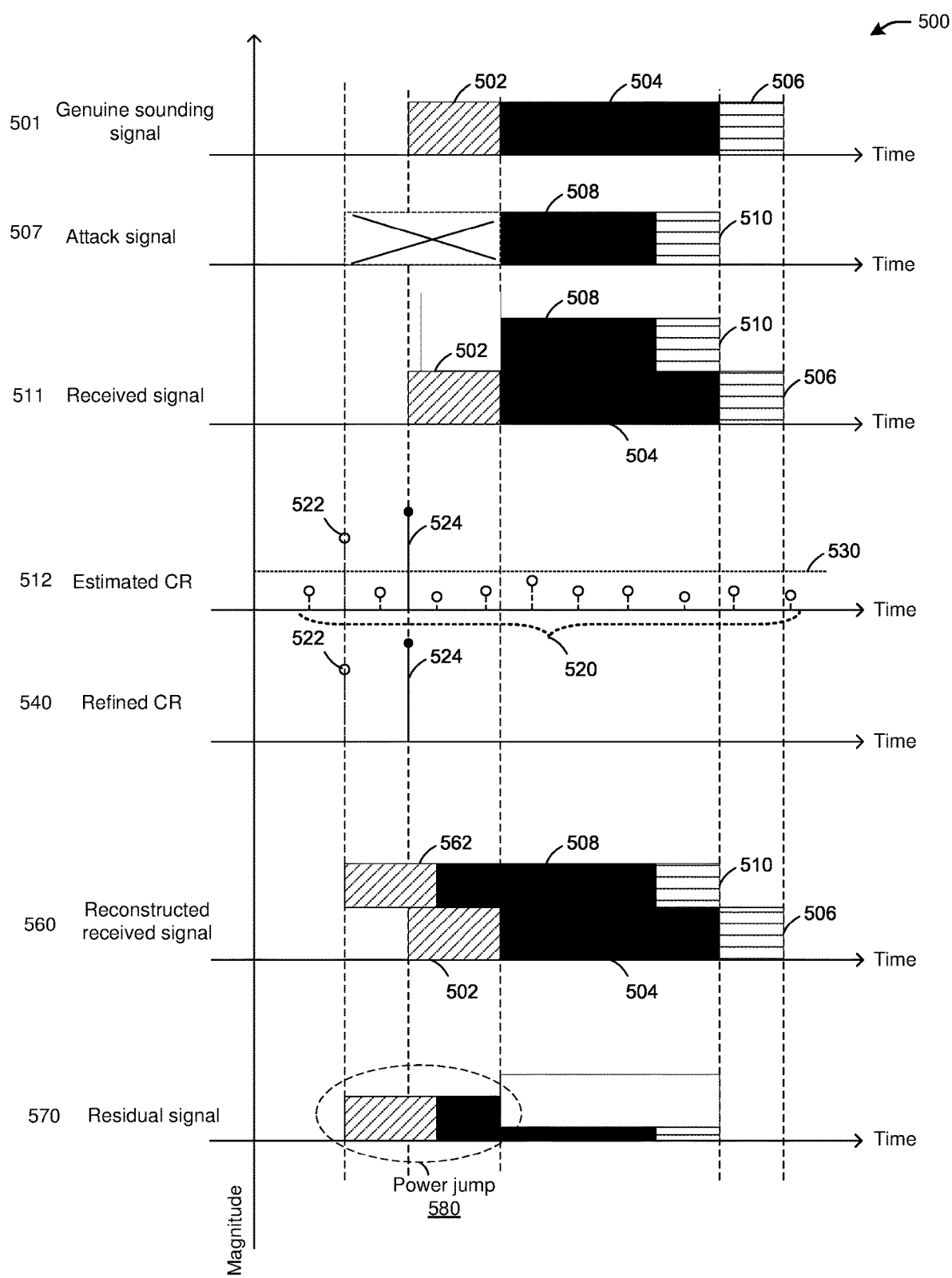
FIG. 5 depicts illustrative sounding signals and signal processing, in accordance with one or more example embodiments of the present disclosure.

In one or more embodiments, the additional feedback information (e.g., included in the LMRs of FIGS. 2A and 2B) to identify attempted attacks as in FIG. 3B may include the estimated channel response in either frequency domain (e.g. FIG. 4) or time domain (e.g., FIG. 3B). The starting time of the channel response needs to be fed back as well. A compression technique may be applied to reduce the feedback overhead. For example, the time domain multipaths below an interference and noise level are not fed back (e.g., as shown in FIG. 5). The delays with respect to the starting time, the amplitudes, and the phases of the strong multipaths above the threshold are fed back. The threshold may be fed back as well. The first and the strong multipaths provide detailed information.

In one or more embodiments, the additional feedback information (e.g., included in the LMRs of FIGS. 2A and 2B) to identify attempted attacks as in FIG. 3B may include the delays, phases, and amplitudes of the first channel arrival (e.g., the ToA of the first sounding signal 358) and the strongest channel arrival (e.g., also the first sounding signal 358 in FIG. 3B). In addition, the PS may be fed back as well. The first and the strongest multipaths provide detailed information and the PS provides the overall information.

In one or more embodiments, the receiver compares the channel responses estimated from the multiple soundings for detecting any inconsistency across the channel responses due to attacks. The differences between two channel responses (e.g., as shown in FIG. 3B and FIG. 4) estimated from two soundings within the channel coherence time is a good metric for detecting the attacks. The differences can be in time domain or frequency domain. Because the clocks (e.g., the frequency clock and the sampling clock) may drift and may be offset, the common phase offset or linear phase shift in frequency domain should be removed before calculating the difference. The common phase offset between two channel responses may be determined using Equation (1) above. The common phase is removed as Equation (2) above. The difference between the two channel responses can be determined using Equation (3) above. The variance of the elements of the difference vector e.g. $d_{2,1}$ or the squared norm of the difference vector e.g. $d_{2,1}$ are denoted by $var(d_{2,1,i})$ and $\|d_{2,1}\|^2$, respectively. The variance or squared norm may be calculated over the differences among more than two channel responses. These are useful indications for identifying the attack. The reason is as follows.

The differences between the two channel responses (e.g., shown in FIG. 3B and in FIG. 4) estimated from the two soundings come from 1) the different noise realizations at the receiver over the two soundings and 2) the attack signals over the two soundings. For the latter part, because the sounding signals usually are changed across soundings, the attacker device 352 needs to change the attack signal accordingly but may fail to do so when not knowing sounding signals beforehand. Because the attacker device 352 needs to listen to the beginning part of the sounding signal for detecting which sounding signal out of a signal set is being sent, the attack signal sent after listening is always not a complete sounding signal (e.g., as shown in FIG. 5). Therefore, the missing beginning parts in the varying attack signals account for part of the differences between the two channel responses estimated at the intended receiver. If the variation of the differences between the two channel responses is significantly greater than the variation caused by the noises received at the intended receiver, it is likely that there is an attack or interference.

FIG. 5 depicts illustrative sounding signals and signal processing 500, in accordance with one or more example embodiments of the present disclosure.

Referring to FIG. 5, a device (e.g., of FIGS. 2A-3B) may generate a genuine (real) sounding signal 501 (e.g., the NDPs of FIGS. 2A-2B, the sounding signals of FIGS. 3A-3B). For example, the genuine sounding signal 501 may include a first portion 502, a second portion 504, and a third portion 506. An attacker (e.g., the attacker device 352 of FIG. 3B) may generate an attack signal 507 (e.g., the fourth sounding signal 364 of FIG. 3B). The attack signal 507 may lack the first portion 502 of the genuine sounding signal 501, but may include a second portion 508 similar to the second portion 504 of the genuine sounding signal 501 and a third portion 510 similar to the third portion 510 of the genuine sounding signal 501. The attack signal 507 may be shifted in time to arrive (e.g., at STA 1 of FIG. 3B) before the genuine sounding signal 501. A received signal 511 (e.g., at STA 1) may be based on the portions of the genuine sounding signal 501 and the attack signal 507 as shown. The receiver device (e.g., STA 1) may estimate the CR 512. The estimated CR 512 may include ToAs 520 (e.g., ToA 522 and ToA 524) with varying magnitudes. The receiver may refine the estimate of the CR 512 by cutting off the channel arrivals beyond the maximum propagation delay (e.g. 0.2 microseconds) and the channel arrivals below a threshold 530 determined by the interference plus noise level. In FIG. 5, only ToA 522 and ToA 524 exceed the threshold 530, so the refined CR 540 includes those ToAs above the threshold 530.

Still referring to FIG. 5, using the refined CR 540, the receiver reconstructs the received sounding signal 560. The reconstructed sounding signal 560 may include a reconstructed portion 562 of the attack signal 507 as shown. The reconstructed sounding signal 560 may be subtracted from the received sounding signal 511 to determine a residual signal 570. If there is no attack, the residual signal 570 may include only noise and interference. If there is an attack signal missing the beginning part of the sounding signal (e.g., attack signal 507), then there are residual signals with power levels above the interference plus noise level (e.g., the power jump 580). The power level of the residual signals at the time interval of the missing beginning part is even higher than the rest as shown. The increased power level (e.g., the power jump 580) in the residual signals can be used to detect the attack. The threshold 530 (e.g., a) may be chosen and exchanged between ranging devices. If var(r)>$\alpha\sigma^2$, then attack is declared, where $\sigma^2$ is the variance of interference plus noise; and r is the residual signal in the decision window e.g. the time interval of the beginning part of the sounding signal corresponding to first detected channel arrival or the time interval of the entire sounding symbol.

For secure applications such as door/monitor unlocking, the two ranging devices need to be close and in line of sight (LOS) condition. If it is not a LOS scenario, it is usually not secure to unlock a door/monitor. For example, a key fob and the car need to be close and in LOS condition so that the car is unlocked. For another example, if the user is outside of the room but in a short distance to the laptop inside the room, the laptop should not be unlocked. In one embodiment, security may be enhanced by the receiver reporting whether the first channel arrival is the strongest multipath among all the multipaths. If the answer is affirmative, it is very likely that the devices are in LOS condition. In the location measurement report (LMR), which the receiver sends to the sounding transmitter, a field or a bit may indicate whether the first channel arrival is the strongest. Checking whether the first arrival is the strongest can be mandated by the spec. For example, for secure ranging, the receiver may only report the strongest arrival as the first channel arrival and treat any arrival detected before the strongest as an interference. For another example, for a certain ranging mode such as secure and short range measurement, the receiver may report the arrival time of the first channel arrival and use an existing field, which indicates the reliability of the measurement, to invalidate the reported arrival time if the first arrival is not the strongest.

In one embodiment, path loss is also a useful channel state information for security checks. The path loss should be the same for the bidirectional soundings since the wireless channels of the two directions are reciprocal. For example, the SNRs or SINRs of the forward and reverse directions should be roughly the same after compensating for the transmission power difference. If the compensated SNRs or SINRs do not match, the measurement results may not be reliable. Therefore, SNR or SINR is also useful for security checks. For the receiver to estimate the path loss, the transmission power of the sounding signal may be fed back e.g., in the LMR. The transmission power is currently not in some existing LMRs. In addition to the transmission power, normalized noise power or normalized interference power or normalized interference plus noise power may be fed back. Alternatively, compensated SNR, SIR, or SINR may be fed back. If the attacker does not know the full information about the sounding signal, the attack signal usually causes interference at the intended receiver. Detecting whether the interference level is increased or not helps to identify an attack. A normalized interference power e.g., the interference power spectrum density may be fed back. Besides the SNR, SIR, or SINR, the ratio of interference to noise may be fed back.

Figure 6:
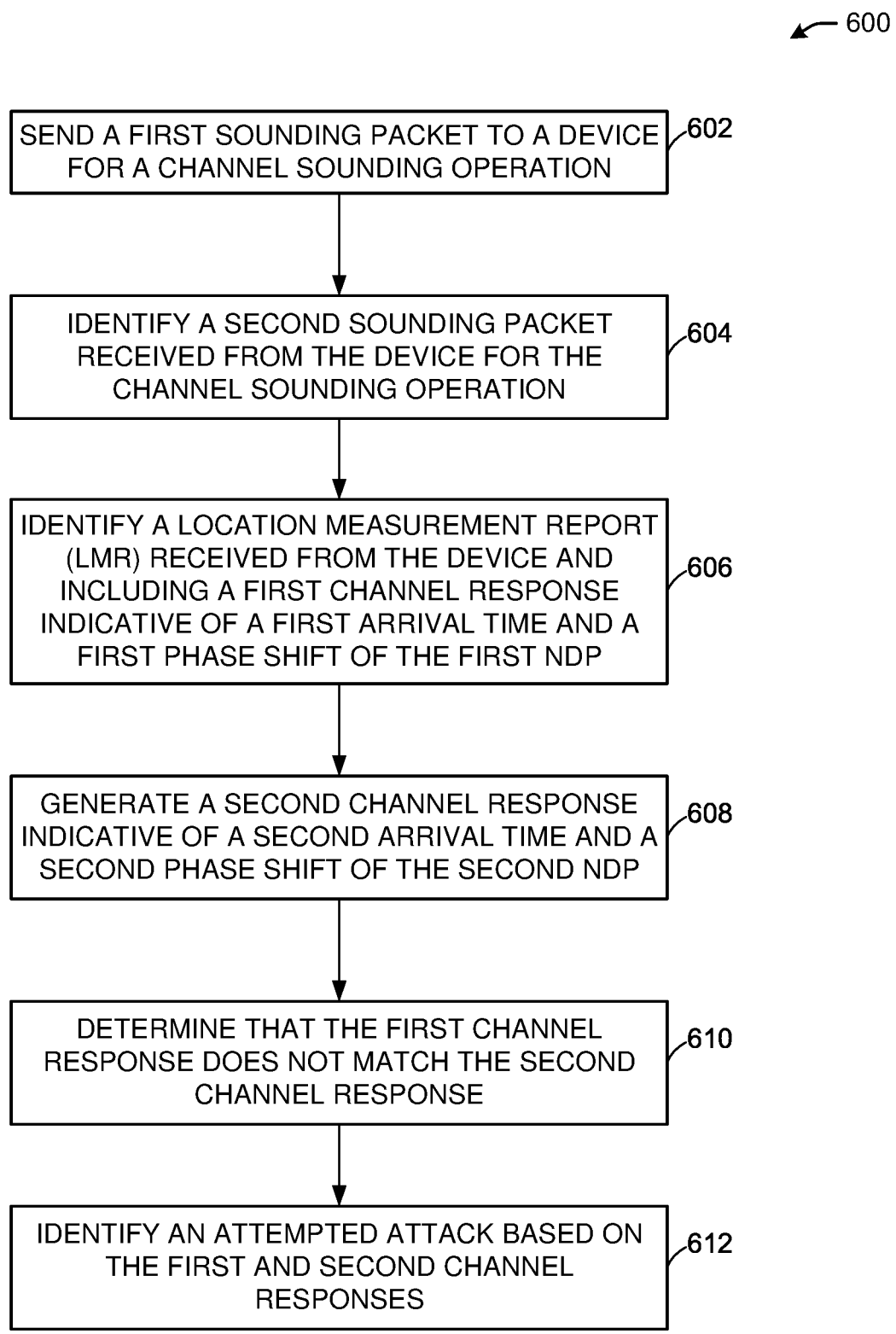
FIG. 6 illustrates a flow diagram of illustrative process for sounding signals and signal processing, in accordance with one or more example embodiments of the present disclosure.

FIG. 6 illustrates a flow diagram of illustrative process 600 for sounding signals and signal processing, in accordance with one or more example embodiments of the present disclosure.

At block 602, a device (e.g., the AP 102 or the user devices 120 of FIG. 1, the AP 202, the STA 204, or the STA 206 of FIG. 2A, the AP 252, the STA 254, or the STA 256 of FIG. 2B, the STA 1 or the STA 2 of FIG. 3B) may generate and send a first sounding packet (e.g., the sounding frames 142 of FIG. 1, the UL NDP 210, the UL NDP 212, or the DL NDP 216 of FIG. 2A, the DL NDP 260, the UL NDP 262, or the UL NDP 264 of FIG. 2B, first sounding signal 358 or the second sounding signal 360 of FIG. 3B, the genuine sounding signal 501 of FIG. 5) as part of a channel sounding operation (e.g., a bi-directional sounding operation between the device and another device).

At block 604, the device may identify a second sounding packet received from another device as part of the channel sounding operation (e.g., the sounding frames 142 of FIG. 1, the UL NDP 210, the UL NDP 212, or the DL NDP 216 of FIG. 2A, the DL NDP 260, the UL NDP 262, or the UL NDP 264 of FIG. 2B, first sounding signal 358 or the second sounding signal 360 of FIG. 3B, the genuine sounding signal 501 of FIG. 5). The first and second sounding packets may be sent and received along the same path between the two devices, so the channel responses estimated by the two devices based on the sounding packets should be the same or very similar.

At block 606, the device may identify a first LMR received from the other device. The first LMR may include ToA information regarding when the first sounding packet was sampled and/or received by the other device, along with other information including a phase shift, a starting time for sampling the received sounding signal, the channel responses that satisfies one or more thresholds based on noise/interference, amplitudes of received sounding packets, phases of received sounding packets, and/or the thresholds. Other information in the first LMR may include delays, phases, and amplitudes of the first channel arrival and the strongest channel arrival, the variance between channel responses, the variance between noise levels associated with received sounding packets, the portion of channel responses above a threshold value, whether the amplitude of the first arrived sounding packet at the other device is the largest amplitude of the sounding packets received by the other device during the sounding operation, transmission power of the sounding packet, SNR, SIR, SINR, and/or path loss.

At block 608, the device may generate a second channel response determined based on sounding packets received from the other device. The second LMR may include ToA information regarding when the second sounding packet was sampled and/or received by the device, along with other information including a phase shift, a starting time for sampling the received sounding signal, the channel responses that satisfies one or more thresholds based on noise/interference, amplitudes of received sounding packets, phases of received sounding packets, and/or the thresholds. Other information in the second channel response may include delays, phases, and amplitudes of the first channel arrival and the strongest channel arrival, the variance between channel responses, the variance between noise levels associated with received sounding packets, the portion of channel responses above a threshold value, whether the amplitude of the first arrived sounding packet at the other device is the largest amplitude of the sounding packets received by the other device during the sounding operation, transmission power of the sounding packet, SNR, SIR, SINR, and/or path loss. Optionally, the device may generate and send a second LMR to the second device to provide the second channel response to the second device.

At block 610, the device may determine whether the first and second channel responses are the same (e.g., in terms of ToAs, phase shifts, amplitude, variance, etc.). When the channel responses match, the match may indicate that the responses were based on the first and second sounding packets rather than on another sounding packet sent by an attacker device.

When the channel responses do not match, the device may, at block 612, identify an attempted attack (e.g., as shown in FIG. 3B).

It is understood that the above descriptions are for purposes of illustration and are not meant to be limiting.

FIG. 7 shows a functional diagram of an exemplary communication station 700, in accordance with one or more example embodiments of the present disclosure. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a feedback device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the feedback device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The feedback device 819 may carry out or perform any of the operations and processes (e.g., process 600) described and shown above.

It is understood that the above are only a subset of what the feedback device 819 may be configured to perform and that other functions included throughout this disclosure may also be performed by the feedback device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
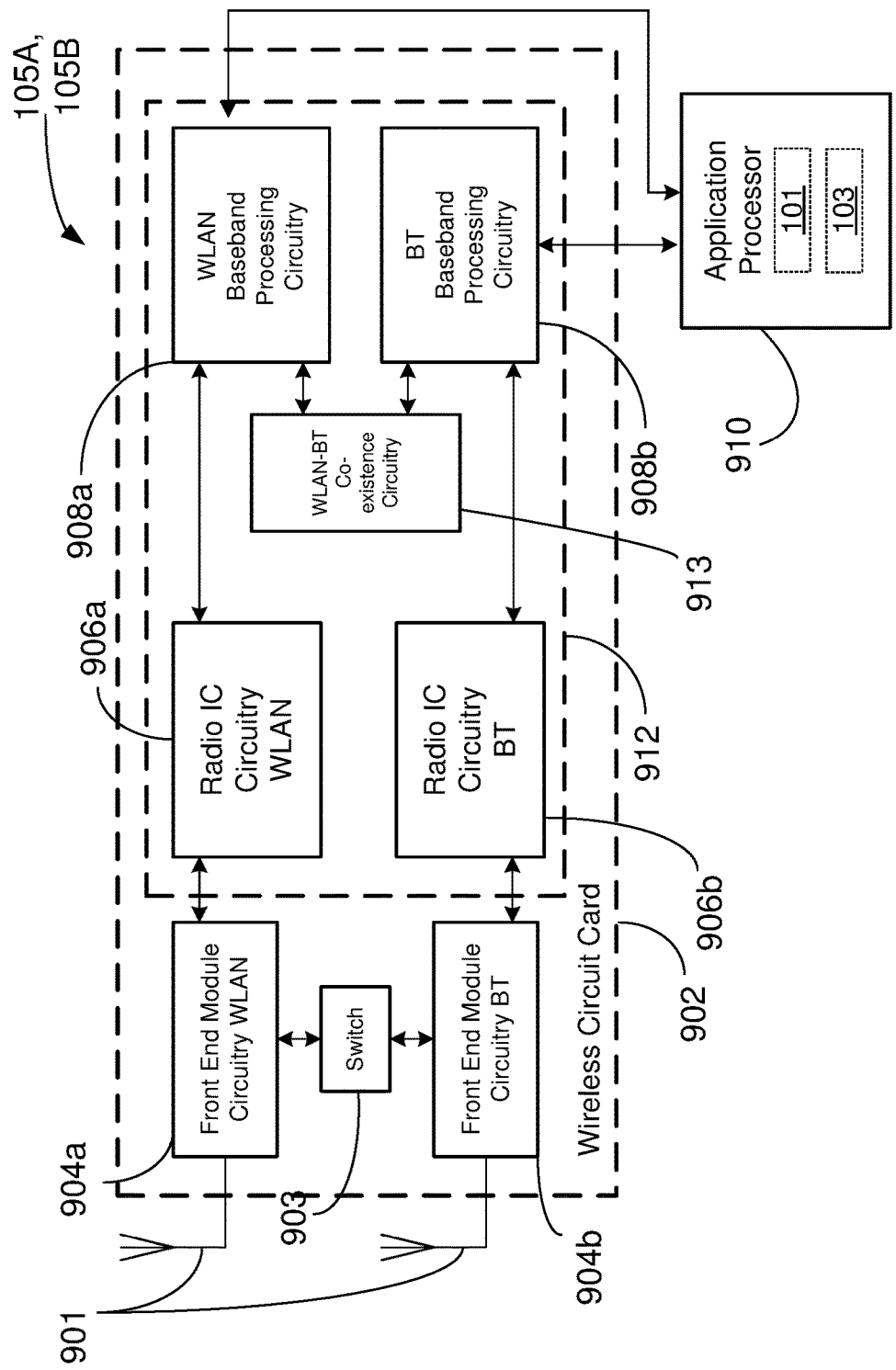
FIG. 9 is a block diagram of a radio architecture in accordance with some examples.

FIG. 9 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 904a-b, radio IC circuitry 906a-b and baseband processing circuitry 908a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904a-b may include a WLAN or Wi-Fi FEM circuitry 904a and a Bluetooth (BT) FEM circuitry 904b. The WLAN FEM circuitry 904a may include a receive signal path comprising circuitry configured to operate on WLAN RF signals received from one or more antennas 901, to amplify the received signals and to provide the amplified versions of the received signals to the WLAN radio IC circuitry 906a for further processing. The BT FEM circuitry 904b may include a receive signal path which may include circuitry configured to operate on BT RF signals received from one or more antennas 901, to amplify the received signals and to provide the amplified versions of the received signals to the BT radio IC circuitry 906b for further processing. FEM circuitry 904a may also include a transmit signal path which may include circuitry configured to amplify WLAN signals provided by the radio IC circuitry 906a for wireless transmission by one or more of the antennas 901. In addition, FEM circuitry 904b may also include a transmit signal path which may include circuitry configured to amplify BT signals provided by the radio IC circuitry 906b for wireless transmission by the one or more antennas. In the embodiment of FIG. 9, although FEM 904a and FEM 904b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906a-b as shown may include WLAN radio IC circuitry 906a and BT radio IC circuitry 906b. The WLAN radio IC circuitry 906a may include a receive signal path which may include circuitry to down-convert WLAN RF signals received from the FEM circuitry 904a and provide baseband signals to WLAN baseband processing circuitry 908a. BT radio IC circuitry 906b may in turn include a receive signal path which may include circuitry to down-convert BT RF signals received from the FEM circuitry 904b and provide baseband signals to BT baseband processing circuitry 908b. WLAN radio IC circuitry 906a may also include a transmit signal path which may include circuitry to up-convert WLAN baseband signals provided by the WLAN baseband processing circuitry 908a and provide WLAN RF output signals to the FEM circuitry 904a for subsequent wireless transmission by the one or more antennas 901. BT radio IC circuitry 906b may also include a transmit signal path which may include circuitry to up-convert BT baseband signals provided by the BT baseband processing circuitry 908b and provide BT RF output signals to the FEM circuitry 904b for subsequent wireless transmission by the one or more antennas 901. In the embodiment of FIG. 9, although radio IC circuitries 906a and 906b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908a-b may include a WLAN baseband processing circuitry 908a and a BT baseband processing circuitry 908b. The WLAN baseband processing circuitry 908a may include a memory, such as, for example, a set of RAM arrays in a Fast Fourier Transform or Inverse Fast Fourier Transform block (not shown) of the WLAN baseband processing circuitry 908a. Each of the WLAN baseband circuitry 908a and the BT baseband circuitry 908b may further include one or more processors and control logic to process the signals received from the corresponding WLAN or BT receive signal path of the radio IC circuitry 906a-b, and to also generate corresponding WLAN or BT baseband signals for the transmit signal path of the radio IC circuitry 906a-b. Each of the baseband processing circuitries 908a and 908b may further include physical layer (PHY) and medium access control layer (MAC) circuitry, and may further interface with a device for generation and processing of the baseband signals and for controlling operations of the radio IC circuitry 906a-b.

Referring still to FIG. 9, according to the shown embodiment, WLAN-BT coexistence circuitry 913 may include logic providing an interface between the WLAN baseband circuitry 908a and the BT baseband circuitry 908b to enable use cases requiring WLAN and BT coexistence. In addition, a switch 903 may be provided between the WLAN FEM circuitry 904a and the BT FEM circuitry 904b to allow switching between the WLAN and BT radios according to application needs. In addition, although the antennas 901 are depicted as being respectively connected to the WLAN FEM circuitry 904a and the BT FEM circuitry 904b, embodiments include within their scope the sharing of one or more antennas as between the WLAN and BT FEMs, or the provision of more than one antenna connected to each of FEM 904a or 904b.

In some embodiments, the front-end module circuitry 904a-b, the radio IC circuitry 906a-b, and baseband processing circuitry 908a-b may be provided on a single radio card, such as wireless radio card 902. In some other embodiments, the one or more antennas 901, the FEM circuitry 904a-b and the radio IC circuitry 906a-b may be provided on a single radio card. In some other embodiments, the radio IC circuitry 906a-b and the baseband processing circuitry 908a-b may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 908b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
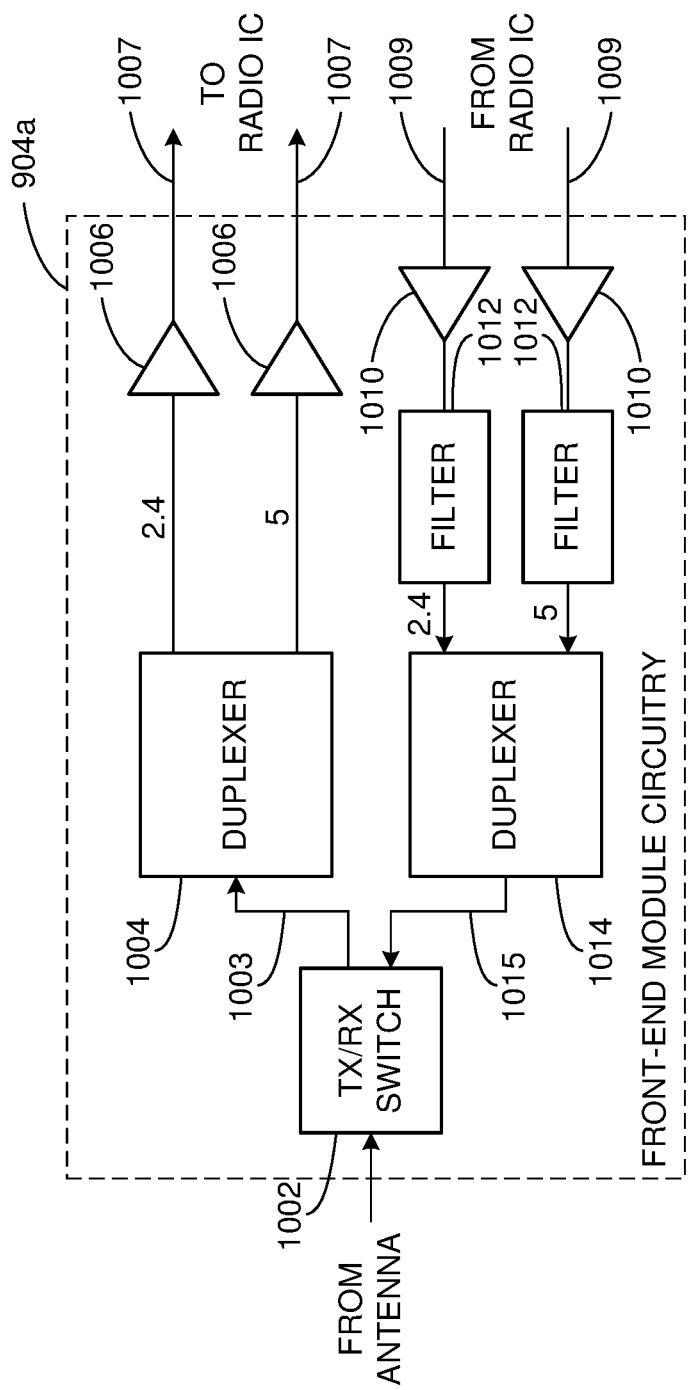
FIG. 10 illustrates an example front-end module circuitry for use in the radio architecture of FIG. 9, in accordance with one or more example embodiments of the present disclosure.

FIG. 10 illustrates WLAN FEM circuitry 904a in accordance with some embodiments. Although the example of FIG. 10 is described in conjunction with the WLAN FEM circuitry 904a, the example of FIG. 10 may be described in conjunction with the example BT FEM circuitry 904b (FIG. 9), although other circuitry configurations may also be suitable.

In some embodiments, the FEM circuitry 904a may include a TX/RX switch 1002 to switch between transmit mode and receive mode operation. The FEM circuitry 904a may include a receive signal path and a transmit signal path. The receive signal path of the FEM circuitry 904a may include a low-noise amplifier (LNA) 1006 to amplify received RF signals 1003 and provide the amplified received RF signals 1007 as an output (e.g., to the radio IC circuitry 906a-b (FIG. 9)). The transmit signal path of the circuitry 904a may include a power amplifier (PA) to amplify input RF signals 1009 (e.g., provided by the radio IC circuitry 906a-b), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 904a may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904a as the one used for WLAN communications.

Figure 11:
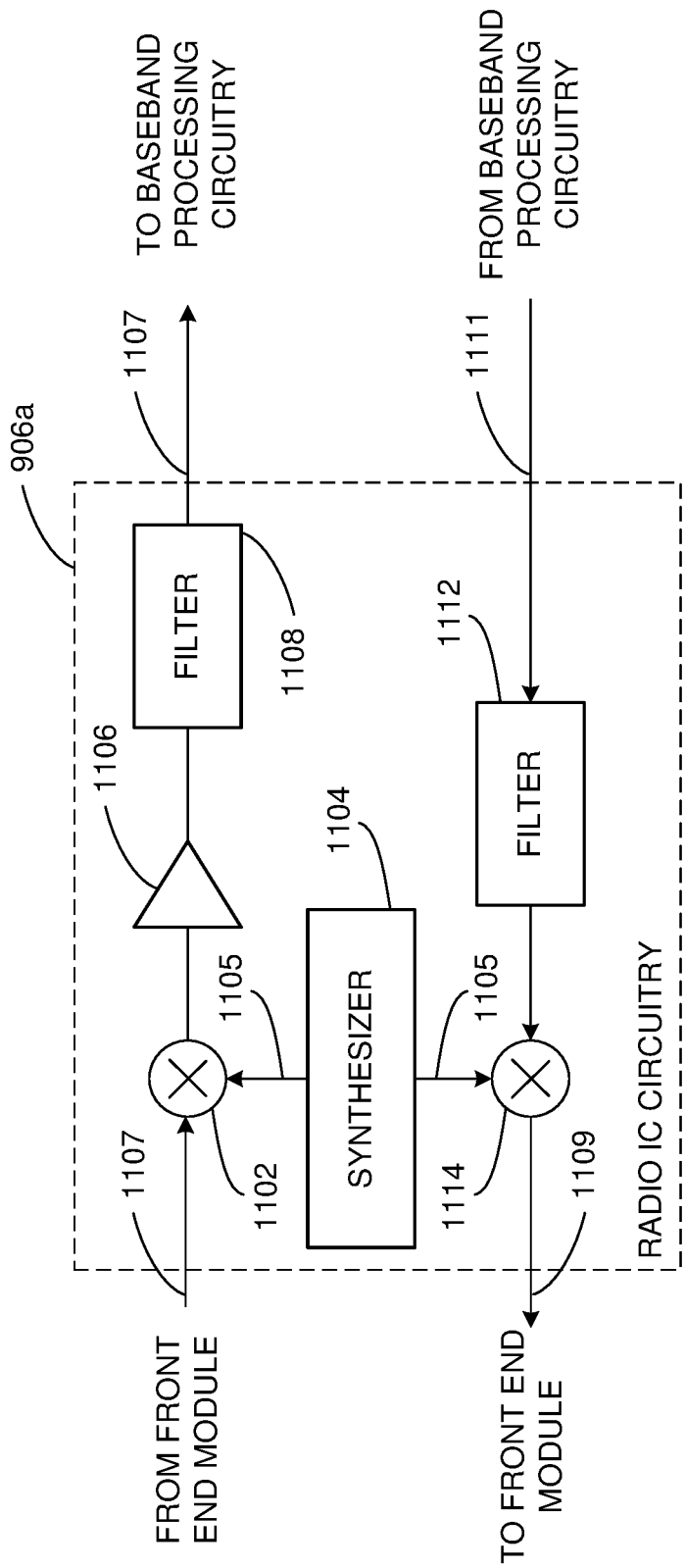
FIG. 11 illustrates an example radio IC circuitry for use in the radio architecture of FIG. 9, in accordance with one or more example embodiments of the present disclosure.

FIG. 11 illustrates radio IC circuitry 906a in accordance with some embodiments. The radio IC circuitry 906a is one example of circuitry that may be suitable for use as the WLAN or BT radio IC circuitry 906a/906b (FIG. 9), although other circuitry configurations may also be suitable. Alternatively, the example of FIG. 11 may be described in conjunction with the example BT radio IC circuitry 906b.

In some embodiments, the radio IC circuitry 906a may include a receive signal path and a transmit signal path. The receive signal path of the radio IC circuitry 906a may include at least mixer circuitry 1102, such as, for example, down-conversion mixer circuitry, amplifier circuitry 1106 and filter circuitry 1108. The transmit signal path of the radio IC circuitry 906a may include at least filter circuitry 1112 and mixer circuitry 1114, such as, for example, up-conversion mixer circuitry. Radio IC circuitry 906a may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904a-b (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908a-b (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904a-b. The baseband signals 1111 may be provided by the baseband processing circuitry 908a-b and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 11 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908*a-b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example secure signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
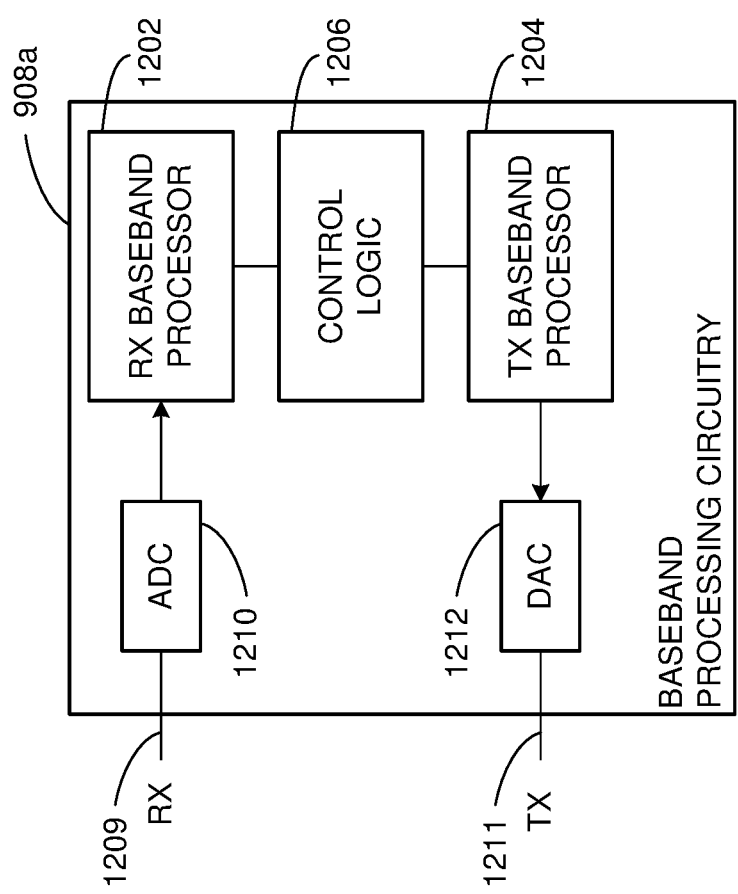
FIG. 12 illustrates an example baseband processing circuitry for use in the radio architecture of FIG. 9, in accordance with one or more example embodiments of the present disclosure.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 11 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908*a* may also include control logic 1206 for coordinating the operations of the baseband processing circuitry 908*a*.

In some embodiments (e.g., when analog baseband signals are exchanged between the baseband processing circuitry 908*a-b* and the radio IC circuitry 906*a-b*), the baseband processing circuitry 908*a* may include ADC 1210 to convert analog baseband signals 1209 received from the radio IC circuitry 906*a-b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: send a first null data packet (NDP) to a second device, the first NDP associated with a channel sounding operation; identify a second NDP received from the second device, the second NDP associated with the channel sounding operation; identify a location measurement report (LMR) received from the second device, the LMR comprising a first channel response of the channel sounding operation, the first channel response indicative of a first arrival time of the first NDP at the second device and a first phase shift associated with the first NDP;

generate a second channel response of the channel sounding operation, the second channel response indicative of a second arrival time of the second NDP received from the second device and a second phase shift associated with the second NDP; determine that the first channel response does not match the second channel response; and identify, based on the determination that the first channel response does not match the second channel response an attempted attack associated with the first NDP or the second NDP.

Example 2 may include the device of example 1 and/or some other example herein, wherein the first channel response further comprises at least one of a first signal-to-noise ratio (SNR) or a first signal-to-interference-plus-noise ratio (SINR) associated with the first NDP, wherein the second channel response comprises at least one of a second SNR or a second SINR associated with the second NDP, and wherein the processing circuitry is further configured to: determine that at least one of the first SNR does not match the second SNR or the first SINR does not match the second SINR, wherein to identify the attempted attack is further based on the determination that at least one of the first SNR does not match the second SNR or the first SINR or the first SINR does not match the second SINR.

Example 3 may include the device of example 1 and/or some other example herein, wherein the LMR further comprises a starting time associated with the second device sampling the first NDP, wherein the first channel response is based on the starting time.

Example 4 may include the device of example 1 and/or some other example herein, wherein to identify the attempted attack is further based on a comparison of the second NDP to a threshold associated with at least one of a starting time associated with the device sampling the second NDP, an amplitude associated with the second NDP, or a phase associated with the second NDP.

Example 5 may include the device of example 4 and/or some other example herein, wherein the second channel response is further indicative of the amplitude associated with the second NDP.

Example 6 may include the device of example 4 and/or some other example herein, wherein the LMR further comprises the threshold.

Example 7 may include the device of example 1 and/or some other example herein, wherein the processing circuitry is further configured to: determine a first variance based on the first channel response and the second channel response; determine a second variance based on a level of noise plus interference associated with the second NDP; and determine that the first variance is greater than the second variance multiplied by a variance threshold, wherein to identify the attempted attack is further based on the determination that the first variance is greater than the second variance multiplied by the variance threshold.

Example 8 may include the device of example 1 and/or some other example herein, wherein the processing circuitry is further configured to: generate a threshold indicative of an interference-plus-noise level; generate a third channel response based on a comparison of the second channel response to the threshold; and generate a reconstructed signal associated with the second NDP based on the third channel response, wherein to identify the attempted attack is further based on the reconstructed signal.

Example 9 may include the device of example 1 and/or some other example herein, wherein the LMR comprises an indication that the first arrival time is not a strongest arrival time of NDPs received by the second device, wherein to identify the attempted attack is further based on the indication.

Example 10 may include the device of example 1 and/or some other example herein, further comprising a transceiver configured to transmit and receive wireless signals comprising the first NDP and the second NDP.

Example 11 may include the device of example 10 and/or some other example herein, further comprising an antenna coupled to the transceiver to cause to send the frames.

Example 12 may include a non-transitory computer-readable medium storing computer-executable instructions which when executed by one or more processors result in performing operations comprising: sending, by a first device, a first null data packet (NDP) to a second device, the first NDP associated with a channel sounding operation; identifying, by the first device, a second NDP received from the second device, the second NDP associated with the channel sounding operation; identifying, by the first device, a location measurement report (LMR) received from the second device, the LMR comprising a first channel response of the channel sounding operation, the first channel response indicative of a first arrival time of the first NDP at the second device and a first phase shift associated with the first NDP; generating, by the first device, a second channel response of the channel sounding operation, the second channel response indicative of a second arrival time of the second NDP received from the second device and a second phase shift associated with the second NDP; determining, by the first device, that the first channel response does not match the second channel response; and identifying, by the first device, based on the determination that the first channel response does not match the second channel response an attempted attack associated with the first NDP or the second NDP.

Example 13 may include the non-transitory computer-readable medium of example 12 and/or some other example herein, wherein the first channel response further comprises at least one of a first signal-to-noise ratio (SNR) or a or a first signal-to-interference-plus-noise ratio (SINR) associated with the first NDP, wherein the second LMR comprises at least one of a second SNR or a second SINR associated with the second NDP, and the operations further comprising: determining that at least one of the first SNR does not match the second SNR or the first SINR does not match the second SINR, wherein identifying the attempted attack is further based on the determination that at least one of the first SNR does not match the second SNR or the first SINR does not match the second SINR.

Example 14 may include the non-transitory computer-readable medium of example 12 and/or some other example herein, wherein the LMR further comprises a starting time associated with the second device sampling the first NDP, and wherein the first channel response is based on the starting time.

Example 15 may include the non-transitory computer-readable medium of example 12 and/or some other example herein, wherein identifying the attempted attack is further based on a comparison of the second NDP to a threshold associated with at least one of a starting time associated with the device sampling the second NDP, an amplitude associated with the second NDP, or a phase associated with the second NDP.

Example 16 may include a method comprising: sending, by processing circuitry of a first device, a first null data packet (NDP) to a second device, the first NDP associated with a channel sounding operation; identifying, by the processing circuitry, a second NDP received from the second device, the second NDP associated with the channel sounding operation; identifying, by the processing circuitry, a location measurement report (LMR) received from the second device, the LMR comprising a first channel response of the channel sounding operation, the first channel response indicative of a first arrival time of the first NDP at the second device and a first phase shift associated with the first NDP; generating, by the processing circuitry, a second channel response of the channel sounding operation, the second channel response indicative of a second arrival time of the second NDP received from the second device and a second phase shift associated with the second NDP; determining, by the processing circuitry, that the first channel response does not match the second channel response; and identifying, by the processing circuitry, based on the determination that the first channel response does not match the second channel response an attempted attack associated with the first NDP or the second NDP.

Example 17 may include the method of example 16 and/or some other example herein, wherein the first channel response further comprises at least one of a first signal-to-noise ratio (SNR) or a first signal-to-interference-plus-noise ratio (SINR) associated with the first NDP, wherein the second LMR comprises at least one of a second SNR or a second SINR associated with the second NDP, the method further comprising: determining that at least one of the first SNR does not match the second SNR or the first SINR does not match the second SINR, wherein identifying the attempted attack is further based on the determination that at least one of the first SNR does not match the second SNR or the first SINR does not match the second SINR.

Example 18 may include the method of example 16 and/or some other example herein, wherein the LMR further comprises a starting time associated with the second device sampling the first NDP, and wherein the first channel response is based on the starting time.

Example 19 may include the method of example 16 and/or some other example herein, wherein identifying the attempted attack is further based on a comparison of the second NDP to a threshold associated with at least one of a starting time associated with the device sampling the second NDP, an amplitude associated with the second NDP, or a phase associated with the second NDP.

Example 20 may include the method of example 16 and/or some other example herein, further comprising: determining a first variance based on the first channel response and the second channel response; determining a second variance based on a level of noise plus interference associated with the second NDP; and determining that the first variance is greater than the second variance multiplied by a variance threshold, wherein identifying the attempted attack is further based on the determination that the first variance is greater than the second variance multiplied by the variance threshold.

Example 21 may include an apparatus comprising means for: sending, by a first device, a first null data packet (NDP) to a second device, the first NDP associated with a channel sounding operation; identifying a second NDP received from the second device, the second NDP associated with the channel sounding operation; identifying a location measurement report (LMR) received from the second device, the LMR comprising a first channel response of the channel sounding operation, the first channel response indicative of a first arrival time of the first NDP at the second device and a first phase shift associated with the first NDP; generating a second channel response of the channel sounding operation, the second channel response indicative of a second arrival time of the second NDP received from the second device and a second phase shift associated with the second NDP; determining that the first channel response does not match the second channel response; and identifying based on the determination that the first channel response does not match the second channel response an attempted attack associated with the first NDP or the second NDP.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    identify a secure symbol of a null data packet (NDP) received by the device during a channel sounding time period;
    detect, based on the secure symbol, an increase in signal interference during the sounding time period; and
    determine, based on the increase in the signal interference during the sounding time period, that at least a portion of the secure symbol represents an attack signal.

2. The device of claim 1, wherein to detect the increase in the signal interference during the sounding time period comprises to detect the increase from a first portion of the secure symbol to a second portion of the secure symbol.

3. The device of claim 1, wherein to detect the increase in the signal interference during the sounding time period comprises to detect a difference in a channel estimation from a first portion of the secure symbol to a second portion of the secure symbol.

4. The device of claim 1, wherein the NDP is a trigger-based NDP.

5. The device of claim 1, wherein the NDP is a non-trigger-based NDP.

6. The device of claim 1, wherein the processing circuitry is further configured to identify a location measurement report (LMR) received from a second device, the LMR comprising a line of sight indicator indicative of whether the second device is in a line of sight of the device.

7. The device of claim 1, further comprising a transceiver configured to transmit and receive wireless signals comprising the NDP.

8. The device of claim 7, further comprising an antenna coupled to the transceiver to receive the NDP.

9. A non-transitory computer-readable medium storing computer-executable instructions which when executed by one or more processors of a device result in performing operations comprising:
    identifying a secure symbol of a null data packet (NDP) received by the device during a channel sounding time period;
    detecting, based on the secure symbol, an increase in signal interference during the sounding time period; and
    determining, based on the increase in the signal interference during the sounding time period, that at least a portion of the secure symbol represents an attack signal.

10. The non-transitory computer-readable medium of claim 9, wherein detecting the increase in the signal interference during the sounding time period comprises detecting the increase from a first portion of the secure symbol to a second portion of the secure symbol.

11. The non-transitory computer-readable medium of claim 9, wherein detecting the increase in the signal interference during the sounding time period comprises detecting a difference in a channel estimation from a first portion of the secure symbol to a second portion of the secure symbol.

12. The non-transitory computer-readable medium of claim 9, wherein the NDP is a trigger-based NDP.

13. The non-transitory computer-readable medium of claim 9, wherein the NDP is a non-trigger-based NDP.

14. The non-transitory computer-readable medium of claim 9, the operations further comprising identifying a location measurement report (LMR) received from a second device, the LMR comprising a line of sight indicator indicative of whether the second device is in a line of sight of the device.

15. A method comprising:
    identifying, by processing circuitry of a device, a secure symbol of a null data packet (NDP) received by the device during a channel sounding time period;
    detecting, by the processing circuitry, based on the secure symbol, an increase in signal interference during the sounding time period; and
    determining, by the processing circuitry, based on the increase in the signal interference during the sounding time period, that at least a portion of the secure symbol represents an attack signal.

16. The method of claim 15, wherein detecting the increase in the signal interference during the sounding time period comprises detecting the increase from a first portion of the secure symbol to a second portion of the secure symbol.

17. The method of claim 15, wherein detecting the increase in the signal interference during the sounding time period comprises detecting the increase from a first portion of the secure symbol to a second portion of the secure symbol.

18. The method of claim 15, wherein the NDP is a trigger-based NDP.

19. The method of claim 15, wherein the NDP is a non-trigger-based NDP.

20. The method of claim 15, further comprising identifying a location measurement report (LMR) received from a second device, the LMR comprising a line of sight indicator indicative of whether the second device is in a line of sight of the device.

* * * * *